US011339846B2

(12) United States Patent
Suzuki

(10) Patent No.: US 11,339,846 B2
(45) Date of Patent: May 24, 2022

(54) SUSPENSION APPARATUS AND RECORDING MEDIUM

(71) Applicant: Showa Corporation, Gyoda (JP)

(72) Inventor: Kota Suzuki, Fukuroi (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 259 days.

(21) Appl. No.: 16/688,483

(22) Filed: Nov. 19, 2019

(65) Prior Publication Data

US 2020/0088262 A1 Mar. 19, 2020

Related U.S. Application Data

(63) Continuation of application No. PCT/JP2017/039374, filed on Oct. 31, 2017, which is
(Continued)

(30) Foreign Application Priority Data

Jul. 11, 2017 (JP) .............................. JP2017-135500

(51) Int. Cl.
*F16F 9/46* (2006.01)
*F16F 9/50* (2006.01)
(Continued)

(52) U.S. Cl.
CPC ............ *F16F 9/50* (2013.01); *B60G 17/0565* (2013.01); *B60G 17/08* (2013.01); *B60G 2500/10* (2013.01)

(58) Field of Classification Search
CPC ................ B60G 13/08; B60G 2400/10; B60G 2400/40; B60G 2400/204; F16F 9/50; F16F 9/325; B62K 25/04
(Continued)

(56) References Cited

U.S. PATENT DOCUMENTS 5,611,413 A * 3/1997 Feigel ........................ F16F 9/46
188/266.5
7,448,479 B2 * 11/2008 Fukuda .................. F16F 9/465
188/266.2
(Continued)

FOREIGN PATENT DOCUMENTS

EP 1930233 A2 6/2008
JP 04-110217 A 4/1992
(Continued)

OTHER PUBLICATIONS

International Search Report dated Feb. 6, 2018 for the corresponding PCT International Patent Application No. PCT/JP2017/039374.

*Primary Examiner* — Christopher P Schwartz
(74) *Attorney, Agent, or Firm* — Leason Ellis LLP

(57) ABSTRACT

A suspension apparatus includes: a damping device; an operating section; and a determination section. The determination section uses a base damping force determined based on a change velocity and an extension occasion adjustment value, or the base damping force, the extension occasion adjustment value and a zero occasion adjustment value to determine a target value of an extension occasion damping force. The determination section uses the base damping force, a compression occasion adjustment value and the zero occasion adjustment value, or the base damping force and the compression occasion adjustment value to determine a target value of an compression occasion damping force. The determination section uses the base damping force and the zero occasion adjustment value to determine a target value of a zero occasion damping force.

6 Claims, 18 Drawing Sheets

Related U.S. Application Data a continuation-in-part of application No. PCT/JP2017/025771, filed on Jul. 14, 2017.

(51) Int. Cl.
*B60G 17/056* (2006.01)
*B60G 17/08* (2006.01)

(58) Field of Classification Search
USPC ............ 188/266.5, 282.3, 282.5; 280/5.505, 280/5.512, 5.514, 5.519
See application file for complete search history.

(56) References Cited

U.S. PATENT DOCUMENTS

| | | | | |
|---|---|---|---|---|
| 7,699,147 | B2* | 4/2010 | Preukschat | F16F 9/512 188/282.4 |
| 8,151,952 | B2* | 4/2012 | Nieder-Vahrenholz | F16F 9/46 188/266.2 |
| 9,205,717 | B2* | 12/2015 | Brady | B60G 17/0162 |
| 9,217,483 | B2* | 12/2015 | Dunaway | B60G 17/0152 |
| 9,879,744 | B2* | 1/2018 | Haller | B60G 99/002 |
| 2013/0328277 | A1 | 12/2013 | Ryan et al. | |
| 2020/0009935 | A1* | 1/2020 | Nakamura | B60G 17/015 |

FOREIGN PATENT DOCUMENTS

| | | |
|---|---|---|
| JP | 2008-137573 A | 6/2008 |
| JP | 2009-227036 A | 10/2009 |
| JP | 2009-227118 A | 10/2009 |
| JP | 2012-096643 A | 5/2012 |
| JP | 2015-217885 A | 12/2015 |

* cited by examiner

SUSPENSION APPARATUS AND RECORDING MEDIUM

CROSS-REFERENCE TO RELATED APPLICATIONS

This application is a continuation of PCT application No. PCT/JP2017/039374, filed on Oct. 31, 2017, which is based upon and claims the benefit of priority to PCT application No. PCT/JP2017/025771 filed on Jul. 14, 2017 and Japanese Patent Application No. 2017-135500 filed on Jul. 11, 2017, the contents of which are incorporated herein by reference.

TECHNICAL FIELD

The present invention relates to a suspension apparatus and a recording medium.

BACKGROUND ART

There has been proposed a technique for allowing a user to adjust a damping force of a variable damping force damper (damping device) in a suspension apparatus (suspension apparatus) of a vehicle provided with the damper which can change its own damping force variably.

For example, a vehicle height adjusting apparatus of a saddle riding type vehicle has been disclosed in PTL 1. The vehicle height adjusting apparatus of the saddle riding type vehicle is provided with a hydraulic jack in a cushion unit of a suspension and changes a length of the cushion unit by increasing/decreasing oil pressure inside the hydraulic jack to adjust a height of the vehicle. In the vehicle height adjusting apparatus of the saddle riding type vehicle, a vehicle height adjusting means for increasing/decreasing the oil pressure inside the hydraulic jack has a plurality of operating sections so that the oil pressure inside the hydraulic jack is increased/decreased by a predetermined amount each time by an operation on each of the operating sections. The following description has been made in the PTL 1. That is, for example, an adjuster for adjusting an extension-side damping force of the damper is integrally provided on a rear side of an upper end portion of the cushion unit, and, for example, an adjuster for adjusting a compression-side damping force of the damper is integrally provided in a lower end portion of the cushion unit.

PTL 1: JP-A-2009-227118

In order to improve a degree of freedom for setting of the suspension, it is desirable that an adjustable range of the damping force of the damping device (damper) is large.

An object of the present invention is to provide a suspension apparatus etc. which can increase an adjustable range of a damping force of a damping device.

SUMMARY OF INVENTION

According to the present invention which has been completed for achievement of the foregoing object, there is provided a suspension apparatus including: a damping device which damps an extension-direction force increasing a relative displacement between a vehicle body and a wheel and which damps a compression-direction force decreasing the relative displacement; an operating section which is operated in order to set an extension occasion adjustment value for adjusting an extension occasion damping force when a change velocity of the relative displacement is positive, a compression occasion adjustment value for adjusting a compression occasion damping force when the change velocity is negative, and a zero occasion adjustment value for adjusting a zero occasion damping force when the change velocity is zero; and a determination section which determines a target value of the extension occasion damping force, a target value of the compression occasion damping force and a target value of the zero occasion damping force; wherein: the determination section uses a base damping force determined based on the change velocity and the extension occasion adjustment value, or the base damping force, the extension occasion adjustment value and the zero occasion adjustment value to determine the target value of the extension occasion damping force, uses the base damping force, the compression occasion adjustment value and the zero occasion adjustment value, or the base damping force and the compression occasion adjustment value to determine the target value of the compression occasion damping force, and uses the base damping force and the zero occasion adjustment value to determine the target value of the zero occasion damping force.

Here, to determine the target value of the extension occasion damping force, the determination section may use the base damping force and the extension occasion adjustment value when the change velocity is equal to or higher than an extension occasion predetermined velocity which is set in advance, and may use the base damping force, the extension occasion adjustment value and the zero occasion adjustment value when the change velocity is lower than the extension occasion predetermined velocity.

In addition, to determine the target value of the compression occasion damping force, the determination section may use the base damping force and the compression occasion adjustment value when the change velocity is equal to or lower than a compression occasion predetermined velocity which is set in advance, and may use the base damping force, the compression occasion adjustment value and the zero occasion adjustment value when the change velocity is higher than the compression occasion predetermined speed.

In addition, according to the present invention, there is provided a suspension apparatus including: a damping device which damps an extension-direction force increasing a relative displacement between a vehicle body and a wheel and which damps a compression-direction force decreasing the relative displacement; an operating section which is operated in order to set an extension occasion adjustment value for adjusting an extension occasion damping force when a change velocity of the relative displacement is positive, and a compression occasion adjustment value for adjusting a compression occasion damping force when the change velocity is negative; a first determination section which determines a target value of the extension occasion damping force and a target value of the compression occasion damping force; and a second determination section which determines a target value of a zero occasion damping force when the change velocity is zero; wherein: the first determination section uses a base damping force determined based on the change velocity, or the base damping force and the extension occasion adjustment value, or the base damping force, the extension occasion adjustment value and the compression occasion adjustment value to determine the target value of the extension occasion damping force, and uses the base damping force, or the base damping force and the compression occasion adjustment value, or the base damping force, the extension occasion adjustment value and the compression occasion adjustment value to determine the target value of the compression occasion damping force; and the second determination section uses the base damping force, or the base damping force, the extension occasion adjustment value and the compression occasion adjustment value to determine the target value of the zero occasion damping force.

Here, the first determination section may use the base damping force and the extension occasion adjustment value to determine the target value of the extension occasion damping force, and use the base damping force and the compression occasion adjustment value to determine the target value of the compression occasion damping force, in a case where an adjustment direction of the extension occasion adjustment value and an adjustment direction of the compression occasion adjustment value are different.

In addition, the second determination section may use the base damping force in a case where an adjustment direction of the extension occasion adjustment value and an adjustment direction of the compression occasion adjustment value are different.

In addition, to determine the target value of the extension occasion damping force in a case where an adjustment direction of the extension occasion adjustment value and an adjustment direction of the compression occasion adjustment value are the same, the first determination section may use the base damping force and the extension occasion adjustment value when the change velocity is equal to or higher than an extension occasion predetermined velocity which is set in advance, and use the base damping force, the extension occasion adjustment value and the compression occasion adjustment value when the change velocity is lower than the extension occasion predetermined velocity.

In addition, to determine the target value of the compression occasion damping force in a case where an adjustment direction of the extension occasion adjustment value and an adjustment direction of the compression occasion adjustment value are the same, the first determination section may use the base damping force and the compression occasion adjustment value when the change velocity is equal to or lower than a compression occasion predetermined velocity which is set in advance, and use the base damping force, the extension occasion adjustment value and the compression occasion adjustment value when the change velocity is higher than the compression occasion predetermined velocity.

In addition, the second determination section may use the base damping force, the extension occasion adjustment value and the compression occasion adjustment value in a case where an adjustment direction of the extension occasion adjustment value and an adjustment direction of the compression occasion adjustment value are the same.

In addition, the first determination section may use the base damping force to determine the target value of the extension occasion damping force and the target value of the compression occasion damping force in a case where the extension occasion adjustment value and the compression occasion adjustment value are zero.

In addition, the second determination section may use the base damping force to determine the target value of the zero occasion damping force in a case where the extension occasion adjustment value and the compression occasion adjustment value are zero.

In addition, the second determination section may use the base damping force in a case where the extension occasion adjustment value or the compression occasion adjustment value is zero and the extension occasion adjustment value and the compression occasion adjustment value are not the same in value.

In addition, according to the present invention, there is provided a non-transitory computer-readable recording medium having a program recorded therein, the program making a computer implement: a function of acquiring an extension occasion adjustment value, a compression occasion adjustment value and a zero occasion adjustment value in a damping device which damps an extension-direction force increasing a relative displacement between a vehicle body and a wheel and which damps a compression-direction force decreasing the relative displacement, the extension occasion adjustment value serving for adjusting an extension occasion damping force when a change velocity of the relative displacement is positive, the compression occasion adjustment value serving for adjusting a compression occasion damping force when the change velocity is negative, the zero occasion adjustment value serving for adjusting a zero occasion damping force when the change velocity is zero; and a function of determining a target value of the extension occasion damping force, a target value of the compression occasion damping force, and a target value of the zero occasion damping force; wherein: the determining function uses a base damping force determined based on the change velocity and the extension occasion adjustment value, or the base damping force, the extension occasion adjustment value and the zero occasion adjustment value to determine the target value of the extension occasion damping force, uses the base damping force, the compression occasion adjustment value and the zero occasion adjustment value, or the base damping force and the compression occasion adjustment value to determine the target value of the compression occasion damping force, and uses the base damping force and the zero occasion adjustment value to determine the target value of the zero occasion damping force.

In addition, according to the present invention, there is provided a non-transitory computer-readable recording medium having a program recorded therein, the program making a computer implement: a function of acquiring an extension occasion adjustment value and a compression occasion adjustment value in a damping device which damps an extension-direction force increasing a relative displacement between a vehicle body and a wheel and which damps a compression-direction force decreasing the relative displacement, the extension occasion adjustment value serving for adjusting an extension occasion damping force when a change velocity of the relative displacement is positive, the compression occasion adjustment value serving for adjusting a compression occasion damping force when the change velocity is negative; a first determination function of determining a target value of the extension occasion damping force and a target value of the compression occasion damping force; and a second determination function of determining a target value of a zero occasion damping force when the change velocity is zero; wherein: the first determination function uses a base damping force determined based on the change velocity, or the base damping force and the extension occasion adjustment value, or the base damping force, the extension occasion adjustment value and the compression occasion adjustment value to determine the target value of the extension occasion damping force, and uses the base damping force, or the base damping force and the compression occasion adjustment value, or the base damping force, the extension occasion adjustment value and the compression occasion adjustment value to determine the target value of the compression occasion damping force; and the second determination function uses the base damping force, or the base damping force, the extension occasion adjustment value and the compression occasion adjustment value to determine the target value of the zero occasion damping force.

According to the present invention, it is possible to provide a suspension apparatus etc. which can increase an adjustable range of a damping force of a damping device.

DESCRIPTION OF EMBODIMENT

An embodiment of the present invention will be described below in detail with reference to the accompanying drawings.

First Configuration Example

Figure 1:
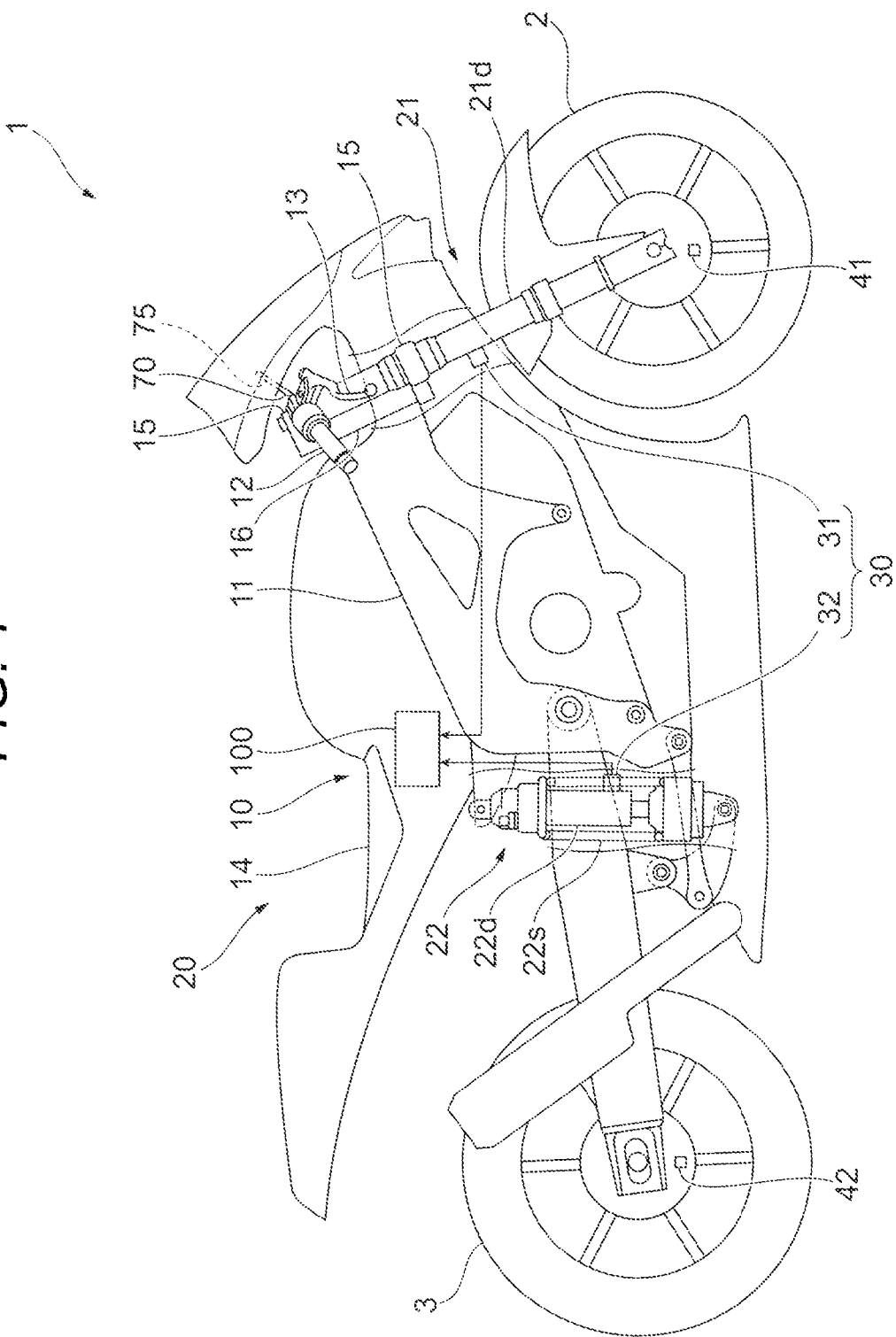
FIG. 1 is a view showing a schematic configuration of a motorcycle according to a first configuration example.

FIG. 1 is a view showing a schematic configuration of a motorcycle 1 according to a first configuration example.

The motorcycle 1 is provided with a front wheel 2, a rear wheel 3, and a vehicle body 10. The front wheel 2 is a wheel on a front side. The rear wheel 3 is a wheel on a rear side. The vehicle body 10 has a vehicle body frame 11, handle 12, brake levers 13, a seat 14, etc. The vehicle body frame 11 forms a frame of the motorcycle 1.

In addition, the motorcycle 1 has front wheel-side suspensions 21 coupling the front wheel 2 and the vehicle body 10 to each other. In addition, the motorcycle 1 is provided with two brackets 15 which retain the suspension 21 disposed on a left side of the front wheel 2 and the suspension 21 disposed on a right side of the front wheel 2, and a shaft 16 which is disposed between the two brackets 15. The shaft 16 is supported on the vehicle body frame 11 rotatably. Each suspension 21 is provided with a suspension spring (not shown) absorbing shock applied from a road surface etc. to the front wheel 2, and a damping device 21d damping vibration of the suspension spring.

In addition, the motorcycle 1 has a rear wheel-side suspension 22 coupling the rear wheel 3 and the vehicle body 10 to each other. The suspension 22 is provided with a suspension spring 22s absorbing shock applied from the road surface etc. to the rear wheel 3, and a damping device 22d damping vibration of the suspension spring 22s.

In the following description, the damping device 21d and the damping device 22d may be generically referred to as "damping device 200".

In addition, the front wheel-side suspension 21 and the rear wheel-side suspension 22 may be generically referred to as "suspension". In addition, the front wheel 2 and the rear wheel 3 may be generically referred to as "wheel".

Figure 2:
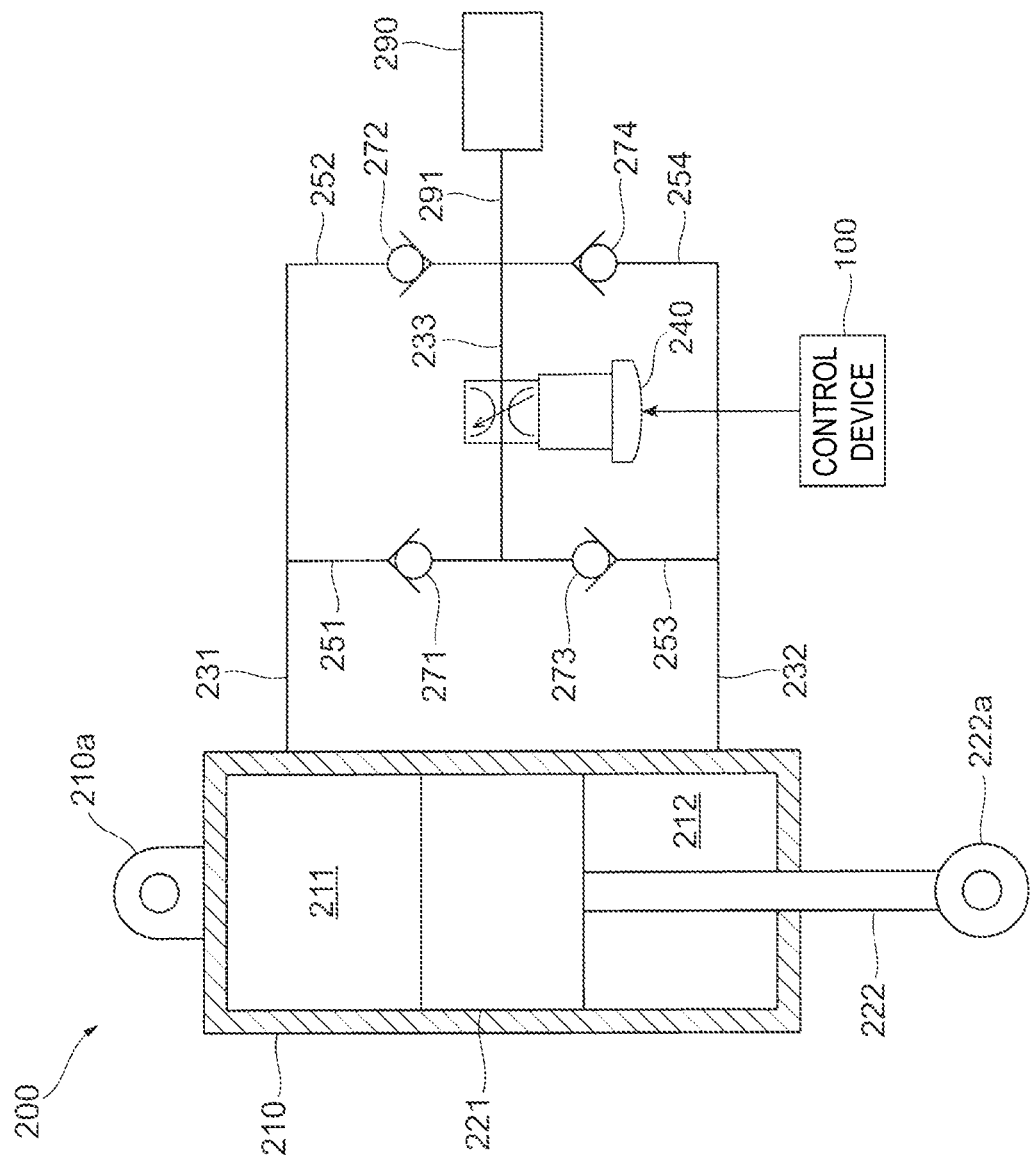
FIG. 2 is a view showing a schematic configuration of a damping device.
Figure 3:
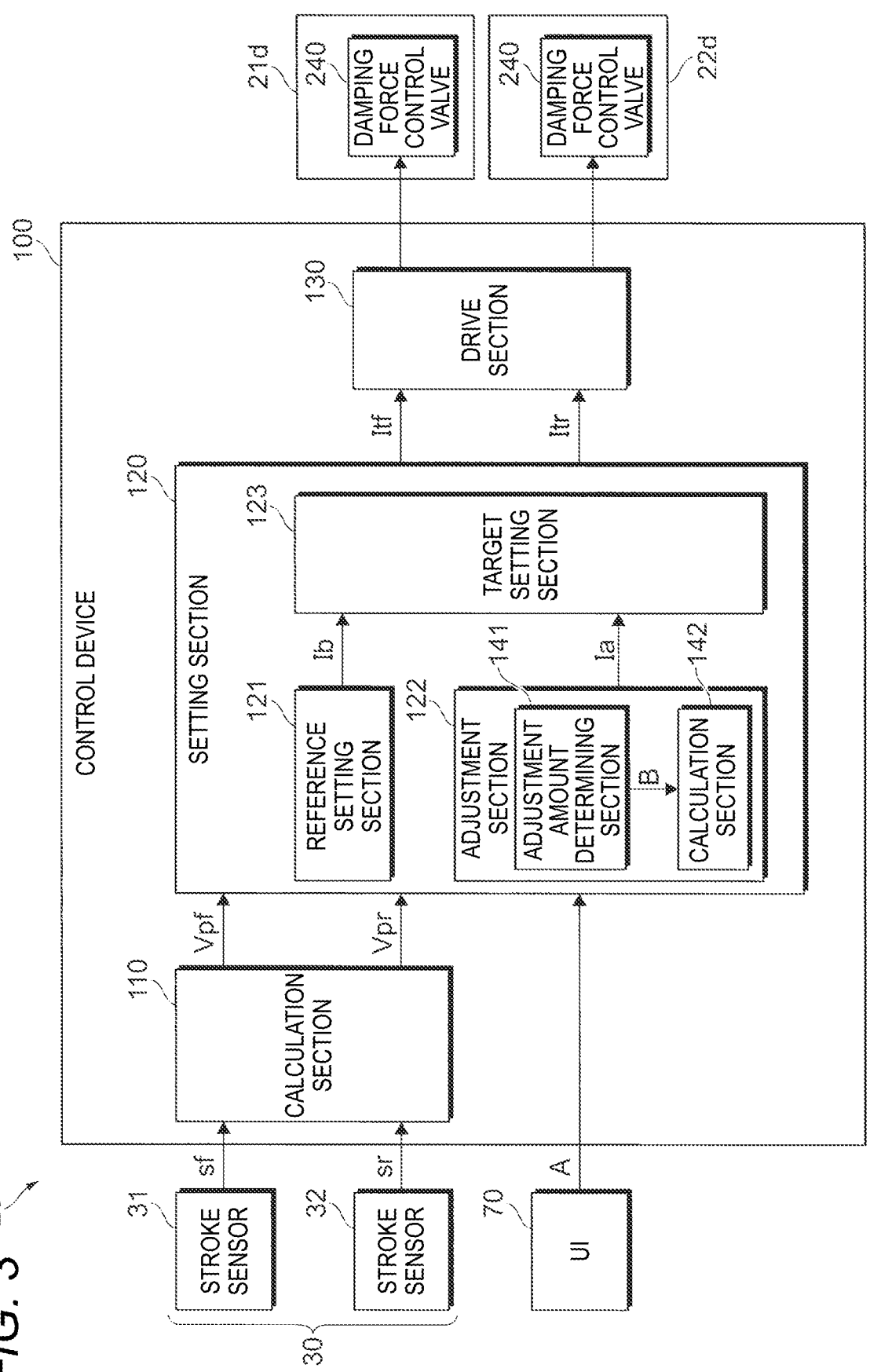
FIG. 3 is a diagram of a schematic configuration of a control device.

FIG. 2 is a view showing a schematic configuration of the damping device 200. FIG. 3 is a diagram showing a schematic configuration of a control device 100.

The motorcycle 1 is provided with the control device 100 controlling damping forces of the damping device 21d and the damping device 22d. Output signals from a stroke sensor 31 detecting an extension/compression amount of the suspension 21, and a stroke sensor 32 detecting an extension/compression amount of the suspension 22 are inputted to the control device 100. In the following description, the stroke sensor 31 and the stroke sensor 32 may be generically referred to as "stroke sensor 30".

In addition, the motorcycle 1 is provided with a user interface 70 as an example of an operating section which can be operated by a user (the user interface 70 will be hereinafter referred to as "UI 70"). For example, the UI 70 can be illustrated to be disposed adjacently to the handle 12 or a tachometer (speed meter) 75. The UI 70 is configured to be able to accept an adjustment value of the damping force of the damping device 200. The UI 70 outputs an adjustment value set by the user to the control device 100.

A suspension apparatus 20 according to the present invention is an apparatus having the suspension (the suspension 21 and the suspension 22), the stroke sensor 30, the UI 70, and the control device 100.

(Damping Device)

The damping device 200 is provided with a cylinder 210 filled with working oil, a piston 221 received movably inside the cylinder 210, and a piston rod 222 retaining the piston 221. One side (upper side in FIG. 2) end portion 210a of the cylinder 210 is coupled to the vehicle body 10. The piston rod 222 retains the piston 221 at its one side end portion, and has the other side (lower side in FIG. 2) end portion 222a coupled to the wheel. Incidentally, the damping device in the present invention is not limited to such a form. The damping device in the present invention may have a configuration in which the other side end portion of the cylinder 210 is coupled to the wheel, and the other side end portion of the piston rod 222 retains the piston 221 while the one side end portion of the piston rod 222 is coupled to the vehicle body 10.

In the damping device 200, a compression stroke is performed in order to move the piston 221 toward the vehicle body 10 side (the upper side in FIG. 2) to thereby reduce the entire length of the damping device 200, and an extension stroke is performed in order to move the piston 221 toward the wheel side (the lower side in FIG. 2) to thereby increase the entire length of the damping device 200.

By the piston 221 received inside the cylinder 210, the cylinder 210 is internally sectioned into a compression-side oil chamber 211 and an extension-side oil chamber 212. Pressure of the working oil in the compression-side oil chamber 211 increases in the compression stroke. Pressure of the working oil in the extension-side oil chamber 212 increases in the extension stroke.

The damping device 200 has a first oil path 231 which is connected to the oil chamber 211 inside the cylinder 210, and a second oil path 232 which is connected to the oil chamber 212 inside the cylinder 210. In addition, the damping device 200 has a third oil path 233 which is provided between the first oil path 231 and the second oil path 232, and a damping force control valve 240 which is provided in the third oil path 233. In addition, the damping device 200 has a first branch path 251 which connects the first oil path 231 and one end portion of the third oil path 233 to each other, and a second branch path 252 which connects the first oil path 231 and the other end portion of the third oil path 233 to each other. In addition, the damping device 200 has a third branch path 253 which connects the second oil path 232 and the one end portion of the third oil path 233 to each other, and a fourth branch path 254 which connects the second oil path 232 and the other end portion of the third oil path 233 to each other.

In addition, the damping device 200 has a first check valve 271 which is provided in the first branch path 251 and which allows the working oil to move from the first oil path 231 toward the third oil path 233 and prohibits the working oil from moving from the third oil path 233 toward the first oil path 231. In addition, the damping device 200 has a second check valve 272 which is provided in the second branch path 252 and which allows the working oil to move from the third oil path 233 toward the first oil path 231 and prohibits the working oil from moving from the first oil path 231 toward the third oil path 233.

In addition, the damping device 200 has a third check valve 273 which is provided in the third branch path 253 and which allows the working oil to move from the second oil path 232 toward the third oil path 233 and prohibits the working oil from moving from the third oil path 233 toward the second oil path 232. In addition, the damping device 200 has a fourth check valve 274 which is provided in the fourth branch path 254 and which allows the working oil to move from the third oil path 233 toward the second oil path 232 and prohibits the working oil from moving from the second oil path 232 toward the third oil path 233.

In addition, the damping device 200 has a reservoir 290 and a reservoir passage 291. The reservoir 290 has a function for storing the working oil and supplying/discharging the working oil. The reservoir passage 291 connects the reservoir 290 and the other end portion of the third oil path 233 to each other.

The damping force control valve 240 has a solenoid. By control of an amount of a current conducted to the solenoid, pressure of the working oil passing through the valve can be controlled. The damping force control valve 240 according to the present configuration example increases the pressure of the working oil passing through the valve as the amount of the current fed to the solenoid increases. The amount of the current conducted to the solenoid is controlled by the control device 100. When oil pressure of one of the oil chamber 211 and the oil chamber 212 of the cylinder 210 becomes higher than releasing pressure, the damping force control valve 240 allows the working oil to flow into the other oil chamber. That is, when the oil pressure of the oil chamber 211 becomes higher than the releasing pressure, the damping force control valve 240 allows the working oil to flow into the oil chamber 212. Thus, the damping force control valve 240 changes a damping force (compression-side damping force) generated when the damping device 200 is in the compression stroke. In addition, when the oil pressure of the oil chamber 212 becomes higher than the releasing pressure, the damping force control valve 240 allows the working oil to flow into the oil chamber 211. Thus, the damping force control valve 240 changes a damping force (extension-side damping force) generated when the damping device 200 is in the extension stroke.

More specifically, when the piston 221 moves toward the oil chamber 211, the oil pressure of the oil chamber 211 increases. The working oil inside the oil chamber 211 moves toward the damping force control valve 240 through the first oil path 231 and the first branch path 251. The pressure of the working oil passing through the damping force control valve 240 is adjusted by valve pressure of the damping force control valve 240. Thus, the compression-side damping force is adjusted. The working oil passing through the damping force control valve 240 flows into the oil chamber 212 through the fourth branch path 254 and the second oil path 232.

On the other hand, when the piston 221 moves toward the oil chamber 212, the oil pressure of the oil chamber 212 increases. The working oil inside the oil chamber 212 moves toward the damping force control valve 240 through the second oil path 232 and the third branch path 253. The pressure of the working oil passing through the damping force control valve 240 is adjusted by the valve pressure of the damping force control valve 240. Thus, the extension-side damping force is adjusted. The working oil passing through the damping force control valve 240 flows into the oil chamber 211 through the second branch path 252 and the first oil path 231.

(Control Device 100)

The control device 100 is an arithmetic and logic circuit including a CPU, an ROM, an RAM, a backup RAM, etc.

A front wheel-side stroke signal sf in which an extension/compression amount of the suspension 21 detected by the stroke sensor 31 has been converted into an output signal, and a rear wheel-side stoke signal sr in which an extension/compression amount of the suspension 22 detected by the stroke sensor 32 has been converted into an output signal are inputted to the control device 100. In addition thereto, a signal etc. from the UI 70 corresponding to an adjustment value A set by the user is inputted to the control device 100.

The control device 100 controls an amount of a current fed to each of the solenoids of the damping force control valves 240 to thereby control a corresponding damping force of the dumping device. As described above, each of the damping force control valves 240 increases the pressure of the working oil passing through the valve as the amount of the current fed to each of the solenoids increases. Therefore, to increase the damping force, the control device 100 increases the amount of the current fed to each of the solenoids of the damping force control valves 240. To decrease the damping force, the control device 100 decreases the amount of the current fed to each of the solenoids of the damping force control valves 240.

The control device 100 is provided with a calculation section 110 which calculates stroke velocities Vpf and Vpr as change velocities of strokes detected by the stroke sensor 30. In addition, the control device 100 is provided with a setting section 120 which sets target currents Itf and Itr fed to the solenoids of the damping force control valves 240, based on the stroke velocities Vpf and Vpr calculated by the calculation section 110, etc. In addition, the control device 100 is provided with a drive section 130 which drives the damping force control valves 240. The control device 100 determines target values of the damping forces of the suspension based on the stroke velocities Vpf and Vpr, etc. At the same time, the control device 100 sets the target currents Itf and Itr which should be used to control the releasing pressures of the damping force control valves 240 so that the damping forces can reach at the target values (target damping forces), and controls the drive section 130 to feed the target currents Itf and Itr to the solenoids.

The calculation section 110 differentiates an output value from the stroke sensor 31 to thereby calculate the front wheel-side stroke velocity Vpf. In addition, the calculation section 110 differentiates an output value from the stroke sensor 32 to thereby calculate the rear wheel-side stroke velocity Vpr. The stroke velocity Vpf and the stroke velocity Vpr may be generically referred to as "stroke velocity Vp".

The drive section 130 is provided with transistors (Field Effect Transistors: FETs) as switching elements, which are, for example, connected between a positive electrode side line of a power supply and coils of the solenoids of the damping force control valves 240 respectively. The drive section 130 drives gates of the transistors to enable the transistors to perform a switching operation to thereby control drive of the damping force control valves 240.

More specifically, the drive section 130 enables the transistors to perform the switching operation so that target currents fed to the damping force control valves 240 can be the target currents Itf and Itr set by the setting section 120. That is, the drive section 130 enables a corresponding one of the transistors to perform the switching operation so that the target current fed to the damping force control valve 240 of the damping device 21d can be the target current Itf set by the setting section 120. In addition, the drive section 130 enables a corresponding one of the transistors to perform the switching operation so that the target current fed to the damping force control valve 240 of the damping device 22d can be the target current Itr set by the setting section 120.

Details of the setting section 120 will be described below.

The setting section 120 sets the front wheel-side target current Itf fed to the solenoid of the damping force control valve 240 of the damping device 21d, based on the stroke velocity Vpf calculated by the calculation section 110, etc. In addition, the setting section 120 sets the rear wheel-side target current Itr fed to the solenoid of the damping force control valve 240 of the damping device 22d, based on the stroke velocity Vpr calculated by the calculation section 110, etc. Incidentally, a technique of setting the target current Itf by the setting section 120 and a technique of setting the target current Itr by the setting section 120 are similar or the same. In the following description, the target current Itf and the target current Itr may be generically referred to as "target current It".

The setting section 120 has a reference setting section 121 and an adjustment section 122. The reference setting section 121 sets a reference current Ib as a reference in setting the target current It. The adjustment section 122 sets an adjustment current Ia for adjusting the damping force based on the adjustment value A.

In addition, the setting section 120 has a target setting section 123. The target setting section 123 adds the reference current Ib set by the reference setting section 121 and the adjustment current Ia set by the adjustment section 122 to thereby finally set the target current It.

Figure 4:
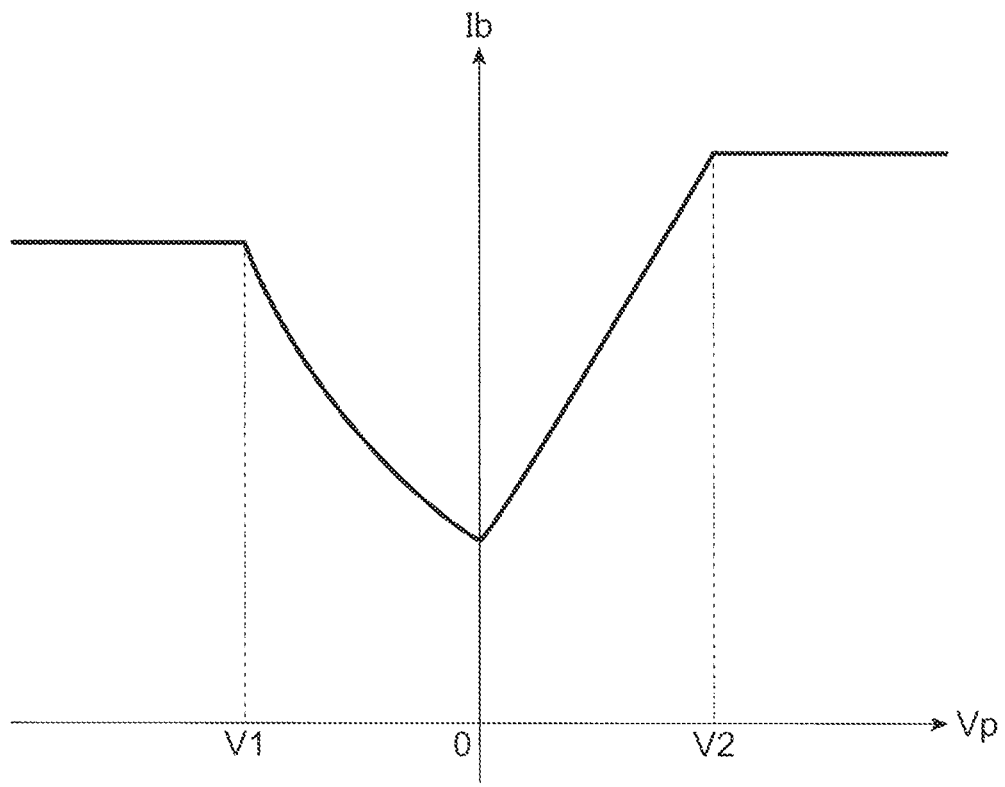
FIG. 4 is a schematic view of a control map showing an example of the relation between a reference current and a stroke velocity.

FIG. 4 is a schematic view of a control map showing an example of the relation between the reference current Ib and the stroke velocity Vp.

The reference setting section 121 calculates the reference current Ib corresponding to the stroke velocity Vp (the stroke velocity Vpf or the stroke velocity Vpr). The reference setting section 121 substrates the stroke velocity Vp into the control map illustrated in FIG. 4 to thereby calculate the reference current Ib. The control map shows the relation between the reference current Ib and the stroke velocity Vp, and has been, for example, created based on a rule of thumb and stored in an ROM in advance. The reference setting section 121 sets the reference current Ib. In other words, this means that the reference setting section 121 sets a base damping force corresponding to the stroke velocity Vp.

Assume that the stroke velocity Vp is a velocity of the suspension in a compression direction in the control map illustrated in FIG. 4. In this case, setting is performed as follows. That is, when the stroke velocity Vp is equal to or higher than a first predetermined velocity V1, the amount of the current increases as the stroke velocity Vp decreases. When the stroke velocity Vp is lower than the first predetermined velocity V1, the amount of the current is constant. In addition, assume that the stroke velocity Vp is a velocity of the suspension in an extension direction. In this case, setting is performed as follows. That is, when the stroke velocity Vp is equal to or lower than a second predetermined velocity V2, the amount of the current increases as the stroke velocity Vp increases. When the stroke velocity Vp is higher than the second predetermined velocity V2, the amount of the current is constant. Incidentally, the reference setting section 121 may change over from one to another among control maps showing the relation between the reference current Ib and the stroke velocity Vp in accordance with a vehicle speed which is a movement speed of the motorcycle 1, and use the changed control map.

As shown in FIG. 3, the adjustment section 122 has an adjustment amount determining section 141 and a calculation section 142. The adjustment amount determining section 141 determines an adjustment amount B based on the adjustment value A set by the user through the UI 70. The calculation section 142 calculates an adjustment current Ia based on the adjustment amount B determined by the adjustment amount determining section 141. The adjustment section 122 sets the adjustment current Ia. In other words, this means that the adjustment section 122 sets an adjustment damping force based on the adjustment value A.

Figure 5:
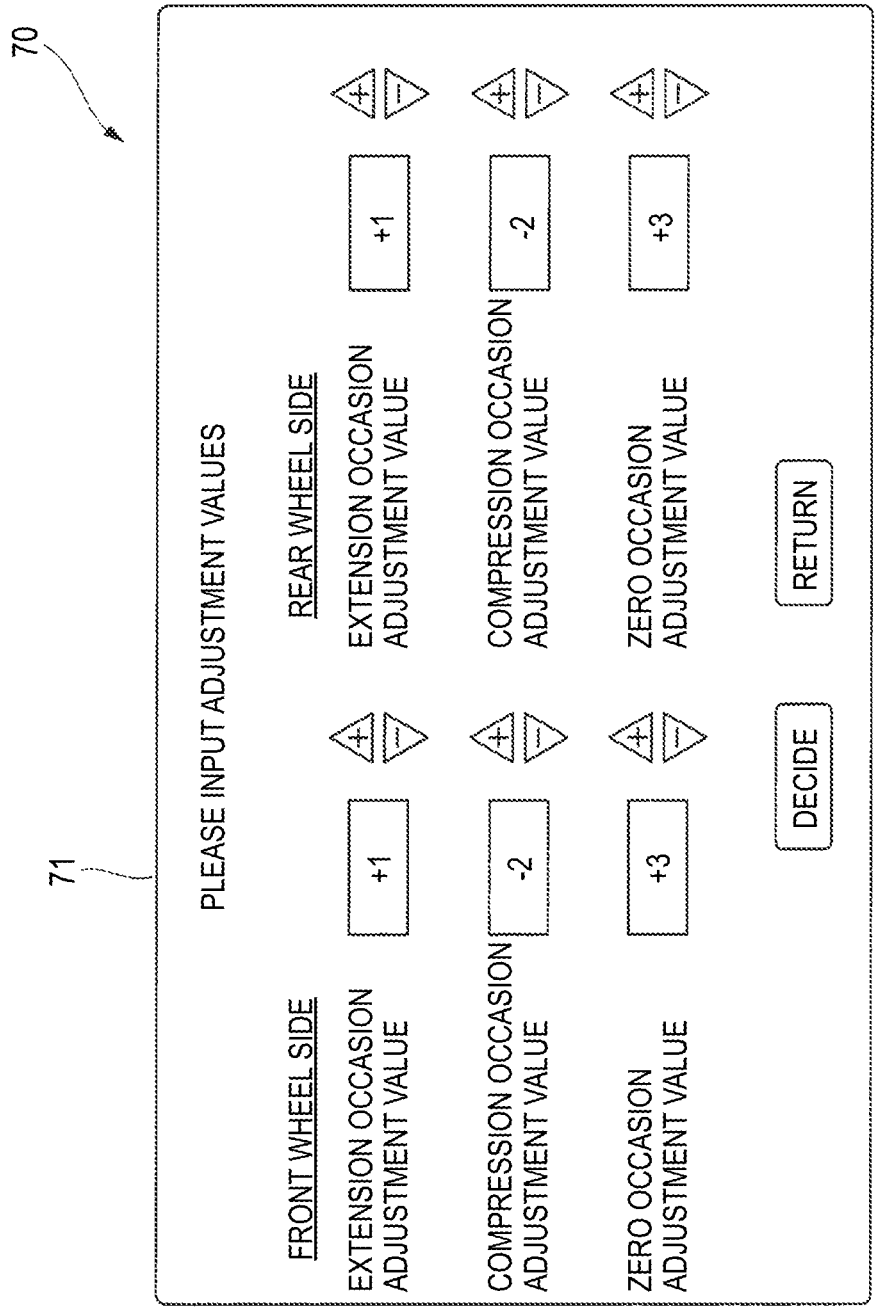
FIG. 5 is a view showing an example of an adjustment value setting screen displayed on a display section of a UI according to the first configuration example.

FIG. 5 is a view showing an example of an adjustment value A setting screen displayed on a display section 71 of the UI 70.

The UI 70 has the display section 71 constituted by a touch panel etc. The UI 70 may have a function of displaying, on the display section 71, information from the control device 100, e.g. a distance the motorcycle 1 has travelled, etc.

The setting screen shown in FIG. 5 is a transition screen, for example, from a normal screen displayed on a normal travelling occasion (e.g. a screen on which the travelling distance etc. is displayed). When, for example, a button displayed on the normal screen or a press button (not shown) provided in the circumference of the display section 71 of the UI 70 is pressed, the screen can be shifted to the setting screen shown in FIG. 5.

The UI 70 has a configuration in which an extension occasion adjustment value for adjusting an extension-side damping force of the damping device 200, i.e. an extension occasion damping force when the stroke velocity Vp is positive, and a compression occasion adjustment value for adjusting a compression-side damping force of the damping device 200, i.e. a compression occasion damping force when the stroke velocity Vp is negative can be set. In addition, the UI 70 has a configuration in which a zero occasion adjustment value for adjusting a zero occasion damping force when the stroke velocity Vp which is zero (0), that is, neither on the extension side nor on the compression side of the damping device 200 can be set. That is, the UI 70 functions as the example of the operating section operated by the user in order to set three adjustment values, i.e. the extension occasion adjustment value, the compression occasion adjustment value, and the zero occasion adjustment value. In the following description, the extension occasion adjustment value may be referred to as "At"; the compression occasion adjustment value, "Ac"; and the zero occasion adjustment value, "A0".

In addition, the UI 70 has a configuration in which an adjustment value for adjusting the damping force of the damping device 21*d* on the front wheel side and an adjustment value for adjusting the damping force of the damping device 22*d* on the rear wheel side can be set, as shown in FIG. 5. Incidentally, the screen shown in FIG. 5 is a screen for setting both the adjustment values for the damping device 21*d* and the damping device 22*d*. However, the screen for setting the adjustment value for the damping device 21*d* and the screen for setting the adjustment value for the damping device 22*d* may be provided as separate screens.

Figure 6:
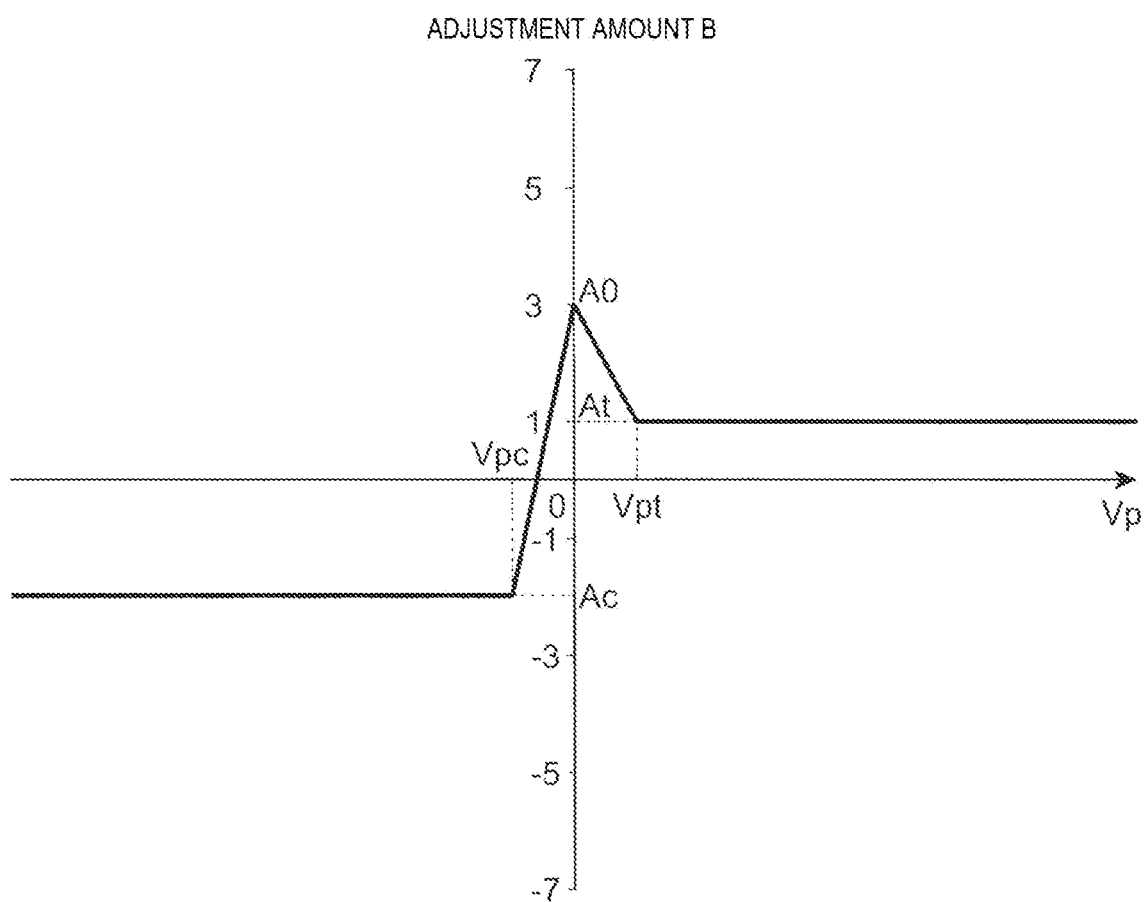
FIG. 6 is a graph showing an example of the relation between the stroke velocity and an adjustment amount.

FIG. 6 is a graph showing an example of the relation between the stroke velocity Vp and the adjustment amount B.

As shown in FIG. 6, the UI 70 has a configuration in which each of At, Ac and A0 can be set at values in seven levels in a direction increasing the damping force and values in seven levels in a direction decreasing the damping force.

As shown in FIG. 6, the adjustment amount determining section 141 determines At as the adjustment amount B when the stroke velocity Vp is equal to or higher than an extension occasion predetermined velocity Vpt which is set in advance. In addition, the adjustment amount determining section 141 determines Ac as the adjustment amount B when the stroke velocity Vp is equal to or lower than a compression occasion predetermined velocity Vpc which is set in advance. In addition, the adjustment amount determining section 141 determines A0 as the adjustment amount B when the stroke velocity Vp is 0.

In addition, the adjustment amount determining section 141 determines a value as the adjustment amount B in a velocity region in which the stroke velocity Vp is higher than 0 but lower than the extension occasion predetermined velocity Vpt. The value changes linearly between A0 and At in the velocity region. That is, a value obtained by substituting the stroke velocity Vp into the following expression (1) is determined as the adjustment amount B. That is, in the case where the stroke velocity Vp is positive, At is determined as the adjustment amount B when the stroke velocity Vp is equal to or higher than the extension occasion predetermined velocity Vpt, and a value obtained by substituting the stroke velocity Vp into the following expression (1) is determined as the adjustment amount B when the stroke velocity Vp is higher than 0 but lower than the extension occasion predetermined velocity Vpt. Thus, setting can be performed with a higher degree of freedom than a background-art adjustment method performed by turning an adjuster or an adjustment method not providing any zero occasion adjustment value.

$$B=(At-A0)/Vpt \times Vp+A0 \quad (1)$$

In addition, the adjustment amount determining section 141 determines a value as the adjustment amount B in a velocity region in which the stroke velocity Vp is higher than the compression occasion predetermined velocity Vpc but lower than 0. The value changes linearly between Ac and A0 in the velocity region. That is, a value obtained by substituting the stroke velocity Vp into the following expression (2) is determined as the adjustment amount B. That is, in the case where the stroke velocity Vp is negative, Ac is determined as the adjustment amount B when the stroke velocity Vp is equal to or lower than the compression occasion predetermined velocity Vpc, and a value obtained by substituting the stroke velocity Vp into the following expression (2) is determined as the adjustment amount B when the stroke velocity Vp exceeds the compression occasion predetermined velocity Vpc. Thus, setting can be performed with a higher degree of freedom than the background-art adjustment method performed by turning the adjuster or the adjustment method not providing any zero occasion adjustment value.

$$B=(Ac-A0)/Vpc \times Vp+A0 \quad (2)$$

Incidentally, a case where an absolute value of Vpt and an absolute value of Vpc are the same can be illustrated. In addition, a case where Vpt is 0.05 (m/s) can be illustrated.

The calculation section 142 multiplies the adjustment amount B determined by the adjustment amount determining section 141 by a current amount Ip which is set in advance, to thereby calculate an adjustment current Ia (Ia=B×Ip).

The target setting section 123 sets a value obtained by adding the reference current Ib set by the reference setting section 121 and the adjustment current Ia set by the adjustment section 122, as a target current It (It=Ib+Ia).

Next, a sequence of a target current setting process performed by the setting section 120 will be described by use of a flow chart.

Figure 7:
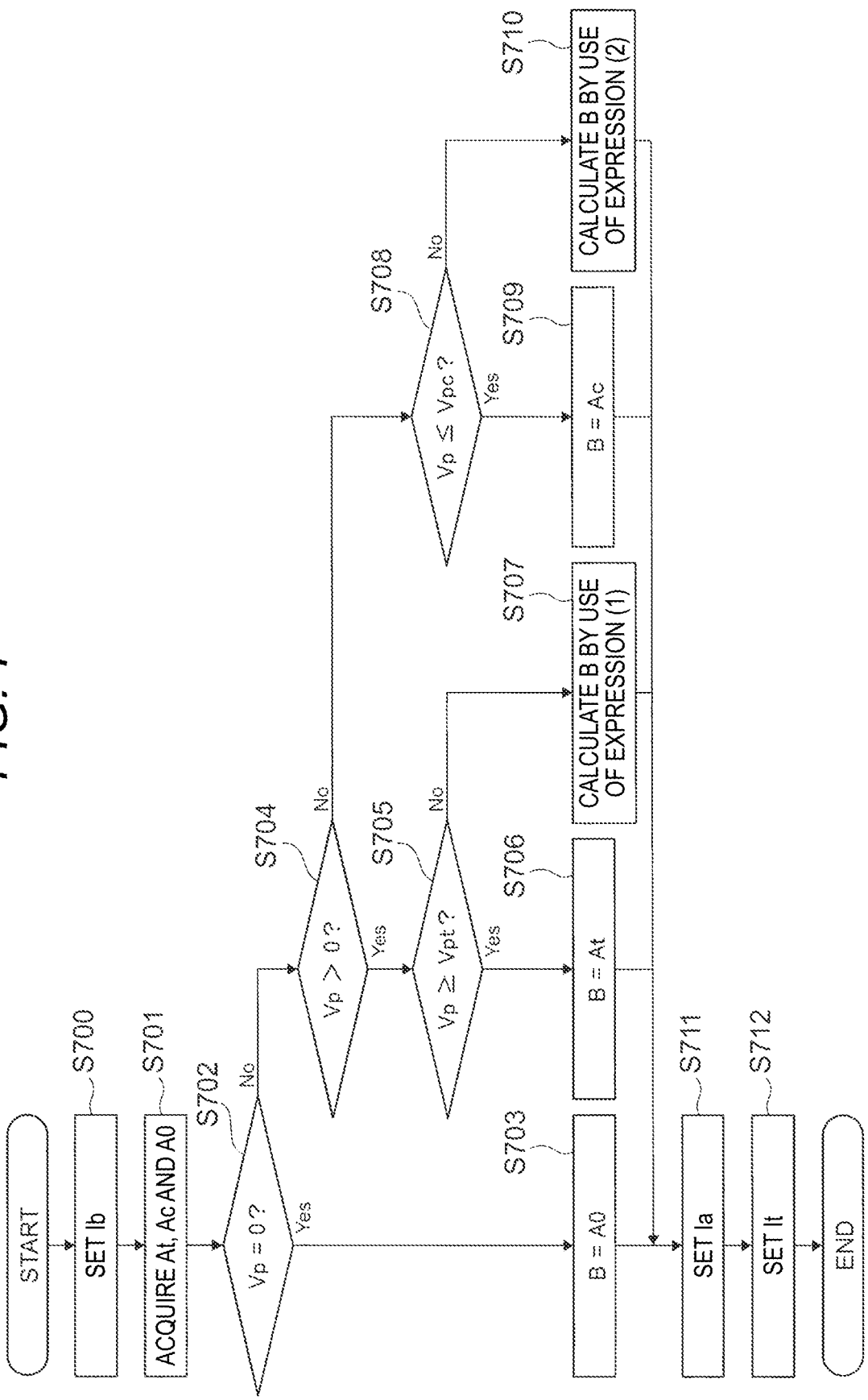
FIG. 7 is a flow chart showing a sequence of a target current setting process performed by a setting section.

FIG. 7 is the flow chart showing the sequence of the target current setting process performed by the setting section 120.

The setting section 120 repeatedly performs the target current setting process every predetermined period of time (e.g. every millisecond).

The setting section 120 sets a reference current Ib (step (which may be hereinafter referred to as "S") 700). This is a process in which the reference setting section 121 acquires a stroke velocity Vp calculated by the calculation section 110, and calculates the reference current Ib based on the acquired stroke velocity Vp and, for example, the control map shown in FIG. 4.

The setting section 120 acquires At, Ac and A0 (S701). This is a process in which the adjustment amount determining section 141 acquires At, Ac and A0 set by the user through the UI 70.

The setting section 120 determines whether the stroke velocity Vp is 0 or not (S702). This is a process in which the adjustment amount determining section 141 of the adjustment section 122 acquires the stroke velocity Vp calculated by the calculation section 110, and determines whether the acquired stroke velocity Vp is 0 or not. When the stroke velocity Vp is 0 (Yes in S702), the adjustment amount determining section 141 determines A0 as an adjustment amount B (S703).

On the other hand, when the stroke velocity Vp is not 0 (No in S702), the adjustment amount determining section 141 determines whether the stroke velocity Vp is positive or not (S704). When the stroke velocity Vp is positive (Yes in S704), the adjustment amount determining section 141 determines whether the stroke velocity Vp is equal to or higher than an extension occasion predetermined velocity Vpt or not (S705). When the stroke velocity Vp is equal to or higher than the extension occasion predetermined velocity Vpt (Yes in S705), the adjustment amount determining section 141 determines At as the adjustment amount B (S706). On the other hand, when the stroke velocity Vp is not equal to or higher than the extension occasion predetermined velocity Vpt (No in S705), the stroke velocity Vp is higher than 0 but lower than the extension occasion predetermined velocity Vpt so that the adjustment amount determining section 141 determines a value obtained by substituting the stroke velocity Vp into the aforementioned expression (1), as the adjustment amount B (S707).

When the stroke velocity Vp is not positive (No in S704), the adjustment amount determining section 141 determines whether the stroke velocity Vp is equal to or lower than a compression occasion predetermined velocity Vpc or not (S708). When the stroke velocity Vp is equal to or lower than the compression occasion predetermined velocity Vpc (Yes in S708), the adjustment amount determining section 141 determines Ac as the adjustment amount B (S709). When the stroke velocity Vp is not equal to or lower than the compression occasion predetermined velocity Vpc (No in S708), the stroke velocity Vp is higher than the compression occasion predetermined velocity Vpc but lower than 0 so that the adjustment amount determining section 141 determines a value obtained by substituting the stroke velocity Vp into the aforementioned expression (2), as the adjustment amount B (S710).

After determining the adjustment amount B in S703, S706, S707, S709 or S710, the setting section 120 sets an adjustment current Ia (S711). This is a process in which the calculation section 142 sets a value obtained by multiplying the adjustment amount B determined in S703, S706, S707, S709 or S710 by a current amount Ip which is set in advance, as the adjustment current Ia (=B×Ip).

Then, the setting section 120 sets a target current It (S712). This is a process in which the target setting section 123 sets a value obtained by adding the reference current Ib set in S700 and the adjustment current Ia set in S711, as the target current It (It=Ib+Ia).

When the setting section 120 performs the target current setting process to set the target current It as described above, the control device 100 controls a damping force of the damping device 200 by the following method (a control method according to the first configuration example).

That is, provided is the method for controlling the damping force of the damping device 200 which damps an extension-direction force increasing a relative displacement between the vehicle body 10 and the wheel and which damps a compression-direction force decreasing the relative displacement, the method being characterized in that:

an extension occasion adjustment value for adjusting an extension occasion damping force when a change velocity of the relative displacement is positive, a compression occasion adjustment value for adjusting a compression occasion damping force when the change velocity is negative, and a zero occasion adjustment value for adjusting a zero occasion damping force when the change velocity is zero are acquired from an operating section which is operated in order to set the extension occasion adjustment value, the compression occasion adjustment value, and the zero occasion adjustment value; and a target value of the extension occasion damping force, a target value of the compression occasion damping force and a target value of the zero occasion damping force are determined based on a base damping force determined based on the change velocity and the extension occasion adjustment value, the compression occasion adjustment value or the zero occasion adjustment value.

That is, the control device 100 acquires At, Ac and A0 set by the user through the UI 70 in the step 701 shown in FIG. 7.

The control device 100 calculates the reference current Ib which is the base of the base damping force, in the step 700 shown in FIG. 7. In addition, the control device 100 determines the adjustment amount B when the stroke velocity Vp is higher than 0, in the step 706 or the step 707 shown in FIG. 7. Then, the control device 100 sets the adjustment current Ia when the stroke velocity Vp is higher than 0, in the step 711. In addition, the control device 100 determines the adjustment amount B when the stroke velocity Vp is lower than 0, in the step 709 or the step 710 shown in FIG. 7. Then, the control device 100 sets the adjustment current Ia when the stroke velocity Vp is lower than 0, in the step 711. In addition, the control device 100 determines the adjustment amount B when the stroke velocity Vp is 0, in the step 703 shown in FIG. 7. Then, the control device 100 sets the adjustment current Ia when the stroke velocity Vp is 0, in the step 711. The control device 100 sets the value obtained by adding the reference current Ib and the adjustment current Ia, as the target current It in S712. In this manner, the control device 100 determines the target value of the extension occasion damping force, the target value of the compression occasion damping force and the target value of the zero occasion damping force based on the base damping force, At, Ac and A0.

Here, in the case where the change velocity is positive, the target value of the extension occasion damping force when the change velocity is equal to or higher than the extension occasion predetermined velocity which is set in advance may be set as a value obtained by adding the base damping force and an extension occasion adjustment damping force determined based on the extension occasion adjustment value, and the target value of the extension occasion damping force when the change velocity is lower than the extension occasion predetermine velocity may be set as a value obtained by adding the base damping force and an extension occasion adjustment damping force determined based on the extension occasion adjustment value and the zero occasion adjustment value.

That is, in the case where the stroke velocity Vp is higher than 0, the control device 100 determines the adjustment amount B when the stroke velocity Vp is equal to or higher than the extension occasion predetermined velocity Vpt, as At in the step 706 shown in FIG. 7. On the other hand, the control device 100 determines the adjustment amount B when the stroke velocity Vp is higher than 0 but lower than the extension occasion predetermined velocity Vpt, as the value calculated by use of the expression (1), i.e. the value calculated based on At and A0, in the step 707. The control device 100 sets the adjustment current Ia in the step 711, and sets the value obtained by adding the reference current Ib and the adjustment current Ia as the target current It in the step 712. In this manner, the control device 100 determines the target value of the extension occasion damping force based on the base damping force and At or At and A0.

In addition, in the case where the change velocity is negative, the target value of the compression occasion damping force when the change velocity is equal to or lower than the compression occasion predetermine velocity which is set in advance may be set as a value obtained by adding the base damping force and a compression occasion adjustment damping force determined based on the compression occasion adjustment value, and the target value of the compression occasion damping force when the change velocity exceeds the compression occasion predetermine velocity may be set as a value obtained by adding the base damping force and a compression occasion adjustment damping force determined based on the compression occasion adjustment value and the zero occasion adjustment value.

That is, in the case where the stroke velocity Vp is lower than 0, the control device 100 determines the adjustment amount B when the stroke velocity Vp is equal to or lower than the compression occasion predetermined velocity Vpc, as Ac in the step 709 shown in FIG. 7. On the other hand, the control device 100 determines the adjustment amount B when the stroke velocity Vp is lower than 0 but higher than the compression occasion predetermined velocity Vpc, as the value calculated by use of the expression (2), i.e. the value calculated based on Ac and A0, in the step 710. The control device 100 sets the adjustment current Ia in the step 711, and sets the value obtained by adding the reference current Ib and the adjustment current Ia as the target current It in S712. In this manner, the control device 100 determines the target value of the compression occasion damping force based on the base damping force and Ac or Ac and A0.

As described above, the setting section 120 of the control device 100 adds the reference current Ib and the adjustment current Ia set based on At, Ac or A0, to thereby set the target current It. In the aforementioned manner, the damping force control valve 240 according to the present configuration example controls the pressure of the working oil passing through the valve, in accordance with the amount of the current fed to the solenoid. The control device 100 controls the amount of the current fed to the solenoid of the damping force control valve 240 to thereby control the damping force of the damping device 200. In other words, the control device 100 controls the amount of the current fed to the solenoid of the damping force control valve 240 so that the damping force of the damping device 200 can be a desired damping force. Accordingly, the control device 100 serves as an example of a determination section which determines the target value of the extension occasion damping force, the target value of the compression occasion damping force and the target value of the zero occasion damping force, based on the base damping force generated due to the reference current Ib set based on the stroke velocity Vp, and At, Ac or A0.

As described above, the suspension apparatus 20 is provided with the damping device 200 which damps the extension-direction force increasing the relative displacement between the vehicle body 10 and the wheel and which damps the compression-direction force decreasing the relative displacement. In addition, the suspension apparatus 20 is provided with the UI 70 as the example of the operating section which is operated in order to set the extension occasion adjustment value for adjusting the extension occasion damping force when the stroke velocity Vp as the change velocity of the relative displacement is positive, the compression occasion adjustment value for adjusting the compression occasion damping force when the stroke velocity Vp is negative, and the zero occasion adjustment value for adjusting the zero occasion damping force when the stroke velocity Vp is zero (0). In addition, the suspension apparatus 20 is provided with the control device 100 as the example of the determination section which determines the target value of the extension occasion damping force (extension occasion target current It), the target value of the compression occasion damping force (compression occasion target current It), and the target value of the zero occasion damping force (zero occasion target current It) based on the base damping force determined based on the stroke velocity Vp, and the extension occasion adjustment value, the compression occasion adjustment value and the zero occasion adjustment value set through the UI 70.

When the stroke velocity Vp is positive and equal to or higher than the extension occasion predetermined velocity Vpt (0<Vpt≤Vp), the control device 100 adds the value obtained by multiplying the current amount Ip which is set in advance by At to the reference current Ib, and sets the resulting value obtained by the addition as the target current It (It=Ib+Ip×At). Thus, the control device 100 sets that target current It by use of the reference current Ib which is the base of the base damping force and At, to thereby determine the target value of the extension occasion damping force.

In addition, when the stroke velocity Vp is positive and lower than extension occasion predetermined velocity Vpt (0<Vp<Vpt), the control device 100 determines the adjustment amount B by use of At, A0 and the expression (1), adds the value obtained by multiplying the current amount Ip which is set in advance by the adjustment amount B to the reference current Ib, and sets the resulting value obtained by the addition as the target current It (It=Ib+Ip×B). Thus, the control device 100 sets the target current It by use of the reference current Ib which is the base of the base damping force, At and A0, to thereby determine the target value of the extension occasion damping force.

In addition, when the stroke velocity Vp is zero, the control device 100 adds the value obtained by multiplying the current amount Ip which is set in advance by A0 to the reference current Ib, and sets the resulting value obtained by the addition as the target current It (It=Ib+Ip×A0). Thus, the control device 100 sets that target current It by use of the reference current Ib which is the base of the base damping force and A0, to thereby determine the target value of the zero occasion damping force.

In addition, when the stroke velocity Vp is negative and higher than the compression occasion predetermined velocity Vpc (Vpc<Vp<0), the control device 100 determines the adjustment amount B by use of Ac, A0 and the expression (2), adds the value obtained by multiplying the current amount Ip which is set in advance by the adjustment amount B to the reference current Ib, and sets the resulting value obtained by the addition as the target current It (It=Ib+Ip×B). Thus, the control device 100 sets the target current It by use of the reference current Ib which is the base of the base damping force, Ac and A0, to thereby determine the target value of the compression occasion damping force.

In addition, when the stroke velocity Vp is negative and equal to or lower than the compression occasion predetermined velocity Vpc (Vp≤Vpc<0), the control device 100 adds the value obtained by multiplying the current amount Ip which is set in advance by Ac to the reference current Ib, and sets the resulting value obtained by the addition as the target current It (It=Ib+Ip×Ac). Thus, the control device 100 sets the target current It by use of the reference current Ib which is the base of the base damping force and Ac, to thereby determine the target value of the compression occasion damping force.

The suspension apparatus 20 configured in the aforementioned manner has a configuration in which the zero occasion damping force when the stroke velocity Vp is zero (0) can be also adjusted by the user in addition to the extension occasion damping force and the compression occasion damping force. Therefore, the adjustable range of the damping force is larger than in a configuration in which only the extension occasion damping force and the compression occasion damping force can be adjusted. In addition, since the zero occasion damping force can be also adjusted, the damping force can be adjusted also in a region where the stroke velocity Vp is higher than the compression occasion predetermined velocity Vpc but lower than the extension occasion predetermined velocity Vpt, which is a region where the damping force is difficult to be adjusted in the configuration in which only the extension occasion damping force and the compression occasion damping force can be adjusted. Thus, the degree of freedom for setting of the front wheel-side suspension 21 and the rear wheel-side suspension 22 can be improved. Accordingly, the front wheel-side suspension 21 and the rear wheel-side suspension 22 can be set in match with user's needs more finely than in the configuration in which only the extension occasion damping force and the compression occasion damping force can be adjusted.

In addition, according to the suspension apparatus 20, the user can adjust the damping force through the UI 70 disposed adjacently to the handle 12. Therefore, the user who has straddled to sit on the seat 14 of the motorcycle 1 can adjust the damping force. In addition, the user can adjust the damping force, for example, without using any tool.

The aforementioned process performed by the control device 100 can be carried out by software and hardware resources cooperating with each other. In this case, a CPU inside a control computer provided in the control device 100 executes a program for implementing the respective functions of the control device 100 to thereby implement the respective functions. For example, a recording medium having the program recorded therein is provided to the control device 100, and the CPU of the control device 100 reads the program stored in the recording medium. In this case, the program per se read from the recording medium implements the function of the aforementioned configuration example. Thus, the program per se and the recording medium having the program recorded therein constitute the present invention. For example, a flexible disk, a CD-ROM, a DVD-ROM, a hard disk, an optical disk, a magnetooptical disk, a CD-R, a magnetic tape, a non-volatile memory card or an ROM can be exemplified as the recording medium for supplying such a program.

Figure 8:
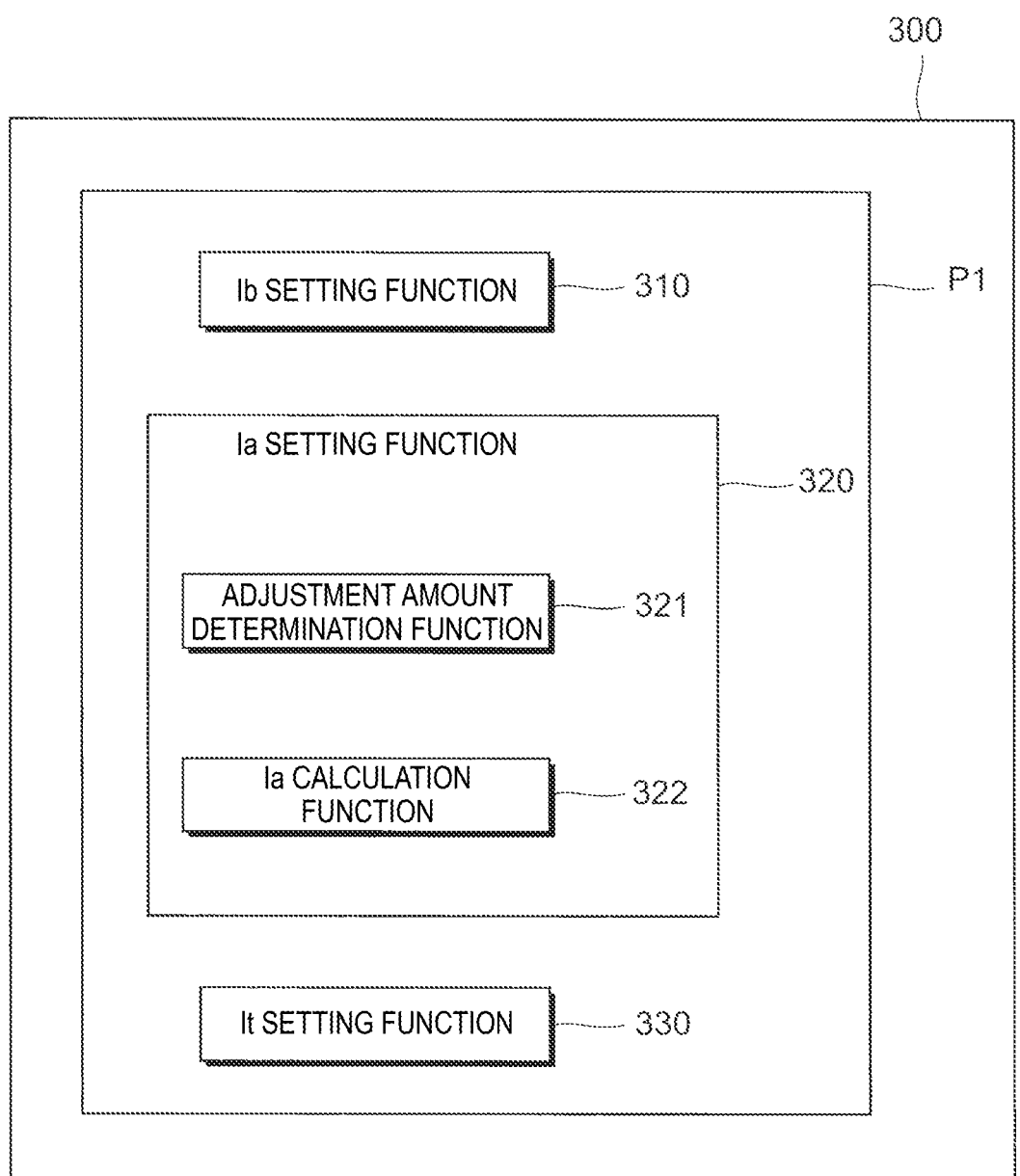
FIG. 8 is a diagram showing a schematic configuration of a recording medium according to the first configuration example.

FIG. 8 is a diagram showing a schematic configuration of a recording medium 300 according to the first configuration example.

As shown in FIG. 8, the recording medium 300 according to the first configuration example stores a program P1. The program P1 includes an Ib setting function 310 of setting a reference current Ib, an Ia setting function 320 of setting an adjustment current Ia for adjusting a damping force based on an adjustment value A, and an It setting function 330 of setting a target current It.

The Ia setting function 320 has an adjustment amount determination function 321 of determining an adjustment amount B, and an Ia calculation function 322 of calculating the adjustment current Ia based on the adjustment amount B.

The Ib setting function 310 is a module implementing the function of the reference setting section 121 shown in FIG. 3.

The Ia setting function 320 is a module implementing the function of the adjustment section 122 shown in FIG. 3.

The It setting function 330 is a module implementing the function of the target setting section 123 shown in FIG. 3.

The adjustment amount determination function 321 is a module implementing the function of the adjustment amount determining section 141 shown in FIG. 3.

The Ia calculation function 322 is a module implementing the function of the calculation section 142 shown in FIG. 3.

As described above, the recording medium 300 according to the first configuration example is a non-transitory computer-readable recording medium having a program recorded therein, the program making a computer implement: a function of acquiring an extension occasion adjustment value, a compression occasion adjustment value and a zero occasion adjustment value in a damping device 200 which damps an extension-direction force increasing a relative displacement between a vehicle body 10 and a wheel and which damps a compression-direction force decreasing the relative displacement, the extension occasion adjustment value serving for adjusting an extension occasion damping force when a change velocity of the relative displacement is positive, the compression occasion adjustment value serving for adjusting a compression occasion damping force when the change velocity is negative, the zero occasion adjustment value serving for adjusting a zero occasion damping force when the change velocity is zero; and a function of determining a target value of the extension occasion damping force, a target value of the compression occasion damping force and a target value of the zero occasion damping force based on a base damping force determined based on the change velocity, and the extension occasion adjustment value, the compression occasion adjustment value or the zero occasion adjustment value.

Incidentally, after the program read from the recording medium 300 is written into an internal memory of the control computer provided in the control device 100, the CPU etc. may perform a portion or the whole of an actual process based on an instruction of the program so that the aforementioned function of the first configuration example can be realized by the process.

In addition, the program of the software implementing the function of the first configuration example may be distributed through a network to be thereby stored in a recording means such as a hard disk or an ROM of the control device 100 or a recording medium such as a CD-RW or a CD-R. In use, the CPU of the control device 100 may read and execute the program stored in the recording means or the recording medium.

Second Configuration Example

Figure 9:
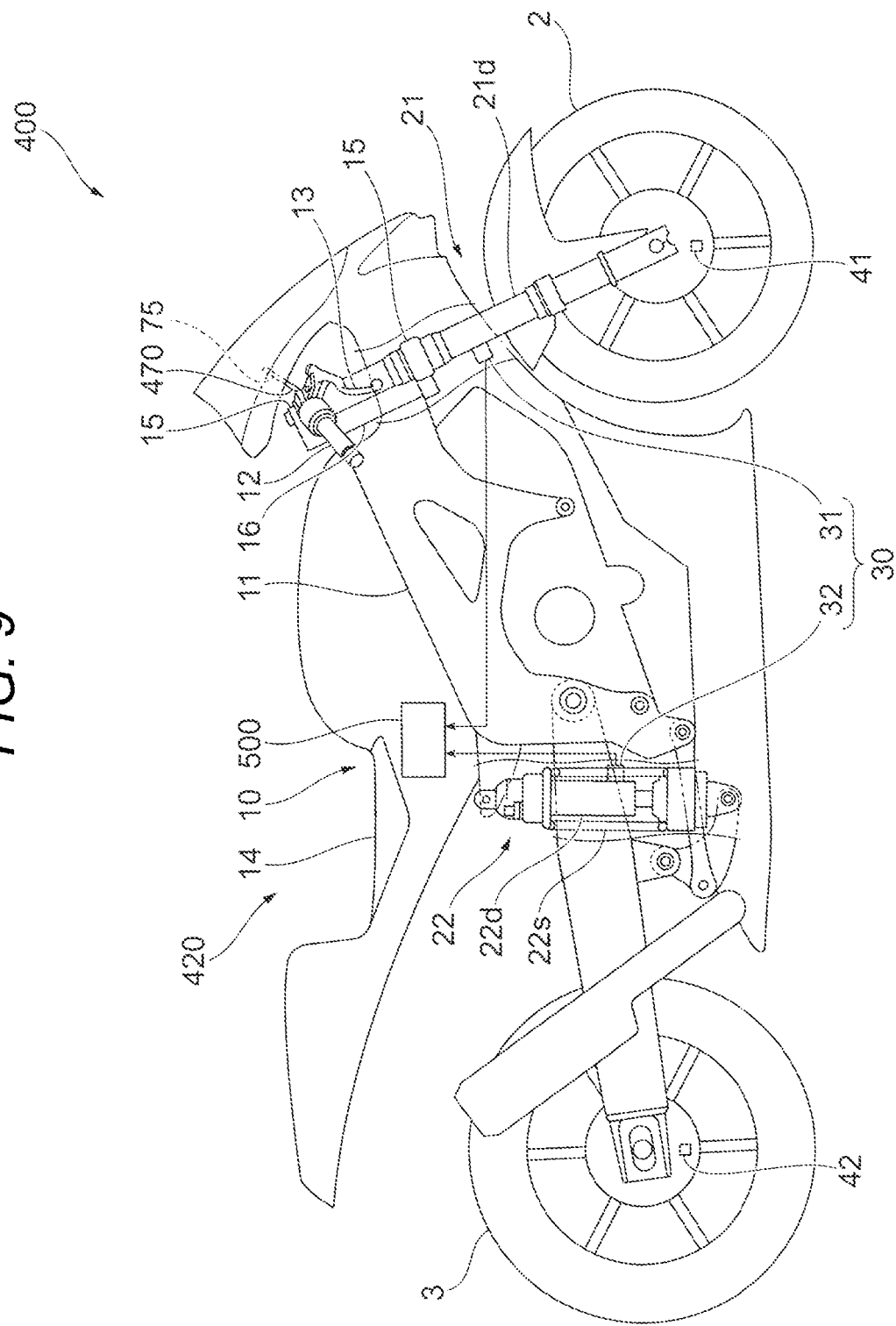
FIG. 9 is a view showing a schematic configuration of a motorcycle according to a second configuration example.

FIG. 9 is a view showing a schematic configuration of a motorcycle 400 according to a second configuration example.

Figure 10:
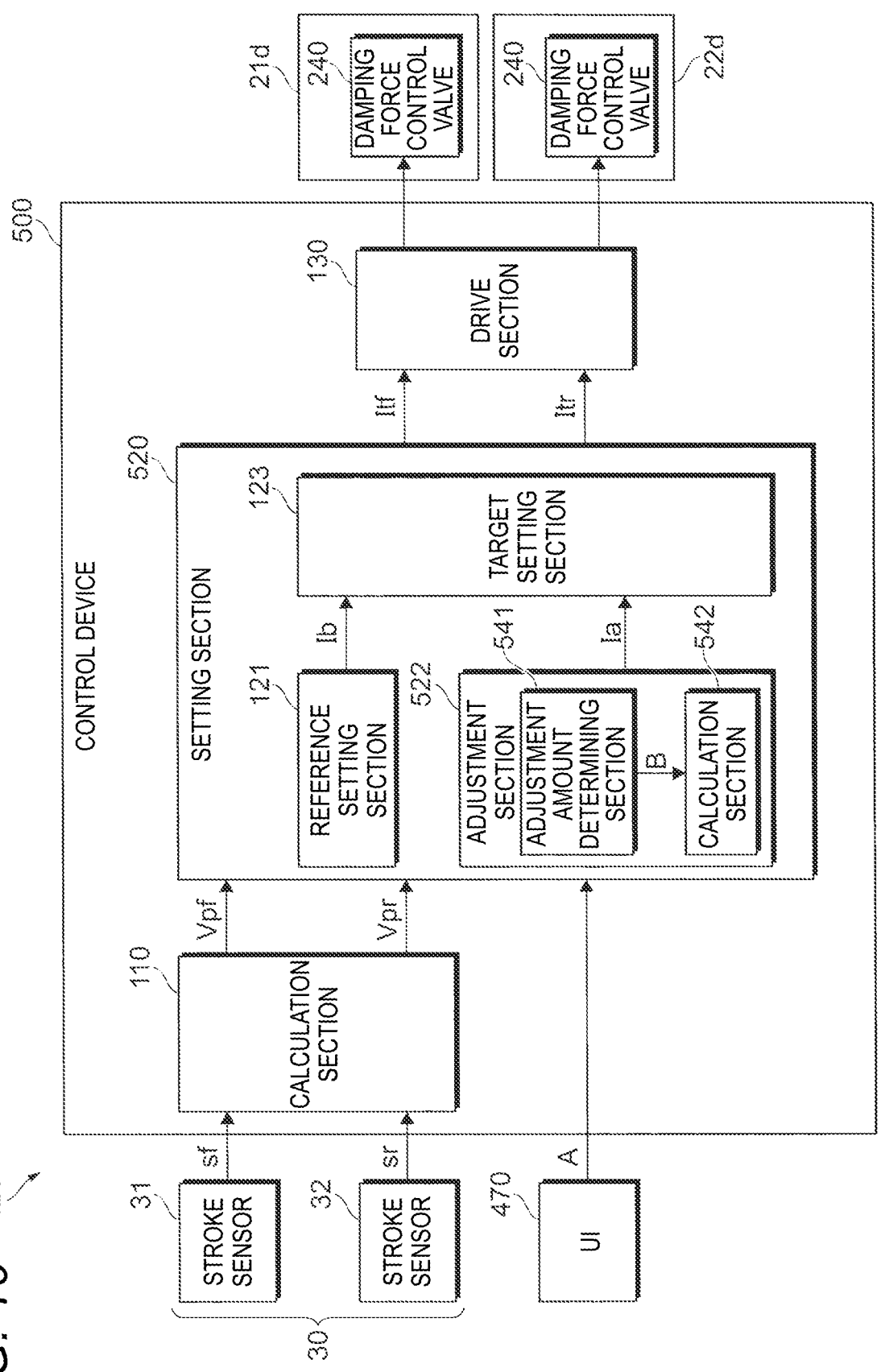
FIG. 10 is a diagram of a schematic configuration of a control device according to the second configuration example.

FIG. 10 is a diagram showing a schematic configuration of a control device 500 according to the second configuration example.

In the motorcycle 400 according to the second configuration example, a constituent corresponding to the UI 70 and a constituent corresponding to the adjustment section 122 are different from those in the motorcycle 1 according to the first configuration example. The different points from the motorcycle 1 according to the first configuration example will be described below. Of the motorcycle 400 according to the second configuration example, constituents having the same shapes and functions as those of the motorcycle 1 according to the first configuration example will be referred to by the same signs correspondingly and respectively, and detailed description thereof will be omitted.

As shown in FIG. 9, the motorcycle 400 according to the second configuration example is provided with a control device 500 which controls each of damping forces of a damping device 21d and a damping device 22d, and a UI 470 which can be operated by a user. A suspension apparatus 420 according to the second configuration example is an apparatus having a suspension (a suspension 21 and a suspension 22), a stroke sensor 30, the UI 470, and the control device 500.

As shown in FIG. 10, the control device 500 according to the second configuration example is provided with a calculation section 110, a setting section 520, and a drive section 130.

The setting section 520 has a reference setting section 121, an adjustment section 522, and a target setting section 123. The reference setting section 121 sets a reference current Ib as a reference in setting a target current It. The adjustment section 522 sets an adjustment current Ia for adjusting a damping force based on an adjustment value A. The target setting section 123 adds the reference current Ib and the adjustment current Ia to thereby finally set the target current It.

As shown in FIG. 10, the adjustment section 522 has an adjustment amount determining section 541 and a calculation section 542. The adjustment amount determining section 541 determines an adjustment amount B based on the adjustment value A set by the user through the UI 470. The calculation section 542 calculates the adjustment current Ia based on the adjustment amount B determined by the adjustment amount determining section 541.

Figure 11:
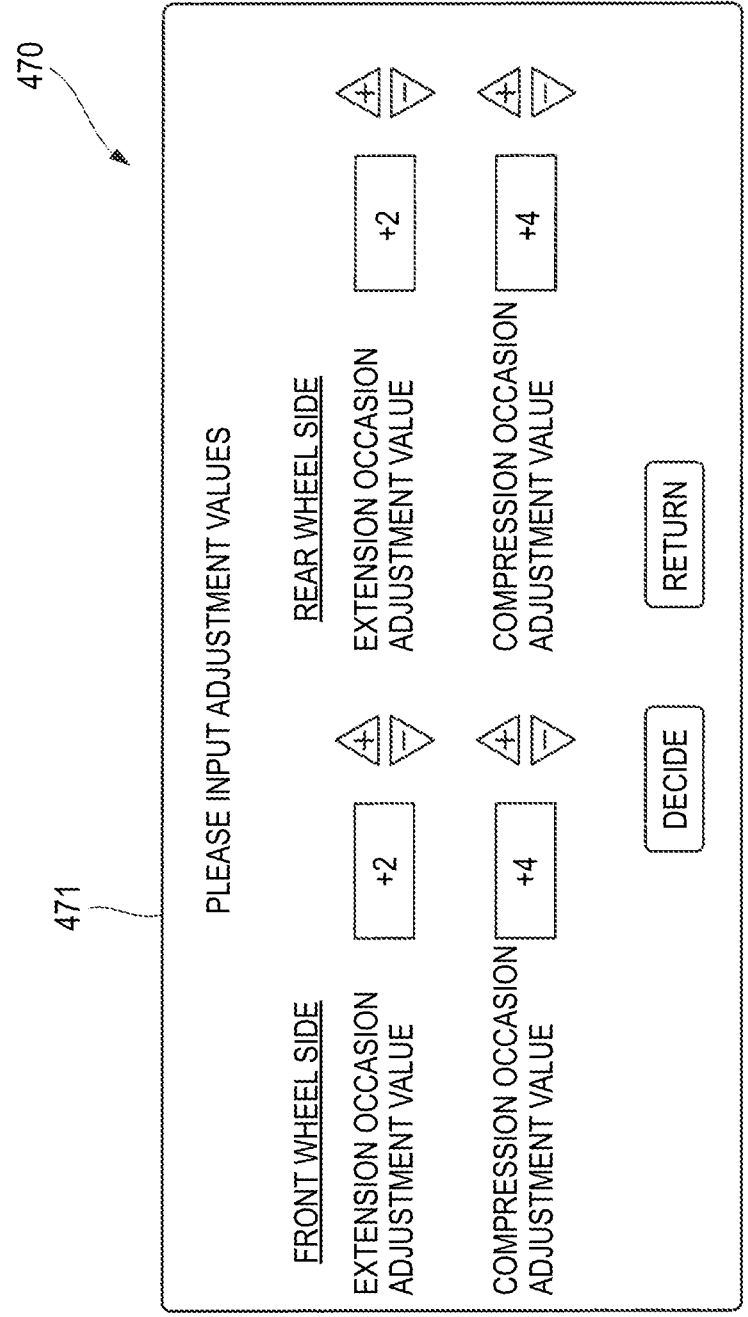
FIG. 11 is a view showing an example of an adjustment value setting screen displayed on a display section of a UI according to the second configuration example.

FIG. 11 is a view showing an example of an adjustment value A setting screen displayed on a display section 471 of the UI 470 according to the second configuration example.

The UI 470 has the display section 471 constituted by a touch panel etc.

The UI 470 has a configuration through which two adjustment values, i.e. an extension occasion adjustment value for adjusting an extension-side damping force (an extension occasion damping force when a stroke velocity Vp is positive) of a damping device 200 and a compression occasion adjustment value for adjusting a compression-side damping force (a compression occasion damping force when the stroke velocity Vp is negative) of the damping device 200 can be set. That is, the UI 470 functions as an example of an operating section which is operated by the user in order to set the extension occasion adjustment value and the compression occasion adjustment value.

Figure 12:
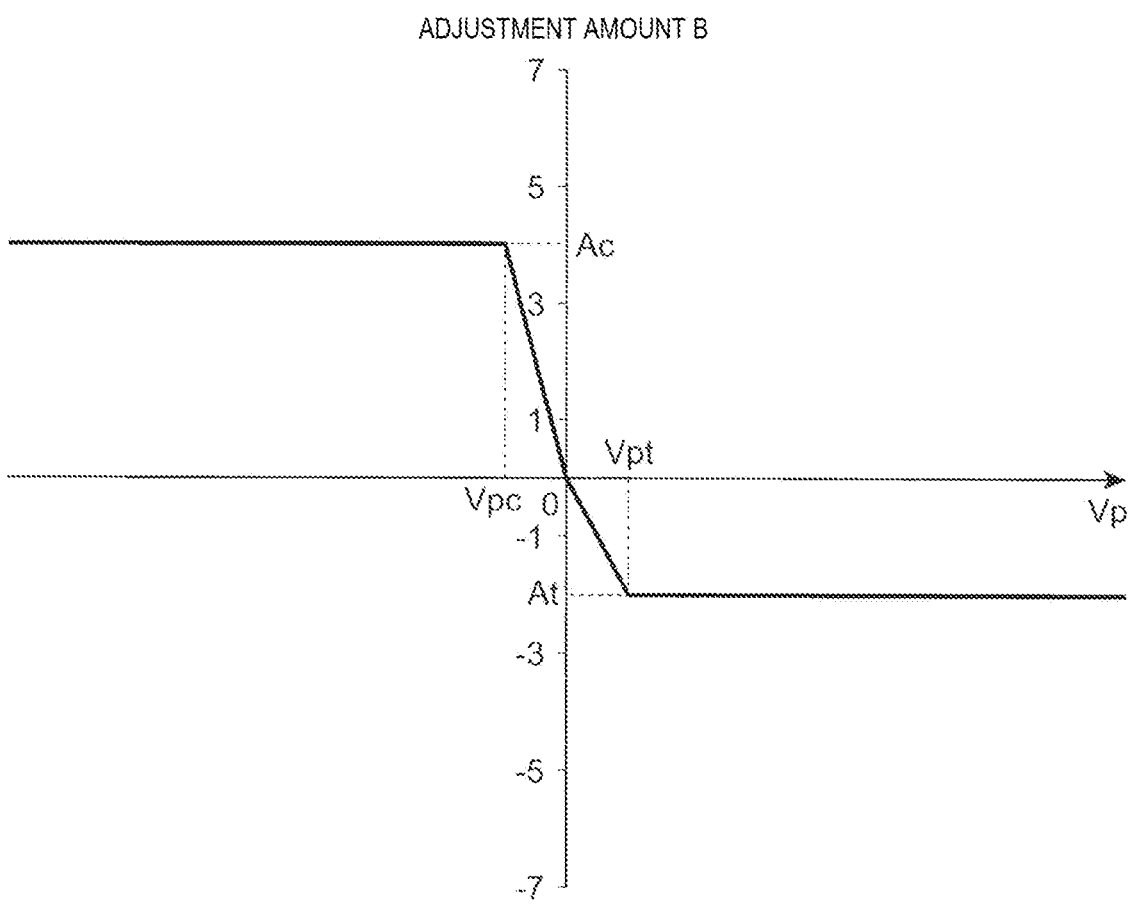
FIG. 12 is a graph showing an example of the relation between a stroke velocity and an adjustment amount when the sign of At and the sign of Ac are different.

FIG. 12 is a graph showing an example of the relation between the stroke velocity Vp and the adjustment amount B when the sign of At and the sign of Ac are different.

Figure 13:
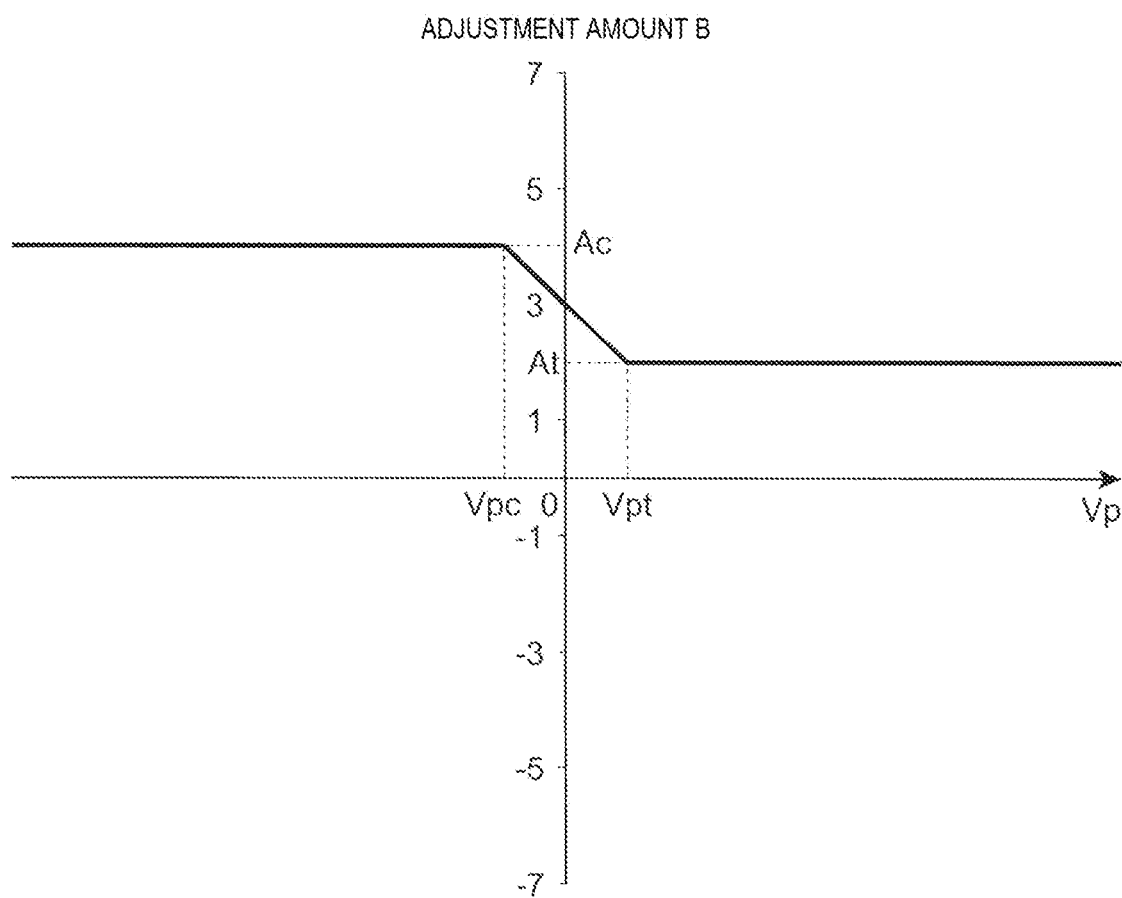
FIG. 13 is a graph showing an example of the relation between the stroke velocity and the adjustment amount when the sign of At and the sign of Ac are the same.

FIG. 13 is a graph showing an example of the relation between the stroke velocity Vp and the adjustment amount B when the sign of At and the sign of Ac are the same.

When the stroke velocity Vp is equal to or higher than an extension occasion predetermined velocity Vpt, the adjustment amount determining section 541 determines At as the adjustment amount B. When the stroke velocity Vp is equal to or lower than a compression occasion predetermined velocity Vpc, the adjustment amount determining section 541 determines Ac as the adjustment amount B. In a velocity region where the stroke velocity Vp is higher than the compression occasion predetermined velocity Vpc but lower than the extension occasion predetermined velocity Vpt, the adjustment amount determining section 541 determines the adjustment amount B as follows.

(I) In the case where the sign of At and the sign of Ac are different, the adjustment amount determining section 541 determines the adjustment amount B as 0 when the stroke velocity Vp is 0, as shown in FIG. 12.

The adjustment amount determining section 541 determines a value as the adjustment amount B in a velocity region where the stroke velocity Vp is higher than 0 but lower than the extension occasion predetermined velocity Vpt. The value changes linearly between 0 and At in the velocity region. That is, the value obtained by substituting the stroke velocity Vp into the following expression (3) is determined as the adjustment amount B.

$$B=At/Vpt \times Vp \quad (3)$$

In addition, the adjustment amount determining section 541 determines a value as the adjustment value B in a velocity region where the stroke velocity Vp is higher than the compression occasion predetermined velocity Vpc but lower than 0. The value changes linearly between Ac and 0 in the velocity region. That is, the value obtained by substituting the stroke velocity Vp into the following expression (4) is determined as the adjustment value B. In the case where an adjustment direction of At and an adjustment direction of Ac are different, a target value of a zero occasion damping force is determined in the this manner. Accordingly, it is possible to avoid a situation that adjustment is made to reduce a damping force in a stroke velocity region where the user wants to increase the damping force, or adjustment is made to increase a damping force in a stroke velocity region where the user wants to decrease the damping force.

$$B=Ac/Vpc \times Vp \quad (4)$$

(II) In the case where the sign of At and the sign of Ac are the same, the adjustment amount determining section 541 determines a value when the stroke velocity Vp is 0, as the adjustment value B when the value is changed linearly in a range of from At to Ac between the compression occasion predetermined velocity Vpc and the extension occasion predetermined velocity Vpt, as shown in FIG. 13. That is, the adjustment amount determining section 541 determines the adjustment amount B when the stroke velocity Vp is 0 (the adjustment amount B when the stroke velocity Vp is 0 will be hereinafter also referred to as "B0") based on the following expression (5). In a case where the adjustment direction of At and the adjustment direction of Ac are the same, the target value of the zero occasion damping force is determined in this manner. Accordingly, it is possible to secure the damping force (adjustment amount B) desired by the user.

$$B0=(Ac \times Vpt-At \times Vpc)/(Vpt-Vpc) \quad (5)$$

The adjustment amount determining section 541 determines a value as the adjustment amount B in a velocity region where the stroke velocity Vp is higher than 0 but lower than the extension occasion predetermined velocity Vpt. The value changes linearly in a range of from B0 to At in the velocity region. That is, the value obtained by substituting the stroke velocity Vp into the following expression (6) is determined as the adjustment amount B.

$$B=(At-B0)/Vpt \times Vp+B0 \quad (6)$$

In addition, the adjustment amount determining section 541 determines a value as the adjustment amount B in a velocity region where the stroke velocity Vp is higher than the compression occasion predetermined velocity Vpc but lower than 0. The value changes linearly in a range of from Ac to B0 in the velocity region. That is, the value obtained by substituting the stroke velocity Vp into the following expression (7) is determined as the adjustment value B.

$$B=(Ac-B0)/Vpc \times Vp+B0 \qquad (7)$$

Incidentally, assume that both At and Ac are 0. In this case, even when the signs of the two adjustment values are regarded as the same or even when the signs of the two adjustment values are regarded as different, the values of the adjustment amounts B are the same.

In addition, in a case where an adjustment value of one of At and Ac is zero, the adjustment amount B when the stroke velocity Vp is zero may be determined as 0 in a similar manner to or the same manner as in the case where the sign of At and the sign of Ac are different. In the case where one of At and Ac is zero, the target value of the zero occasion damping force is determined in this manner. Accordingly, it is possible to set the extension side and the compression side independently and individually.

Next, a sequence of a target current setting process performed by the setting section 520 according to the second configuration example will be described by use of a flow chart.

Figure 14:
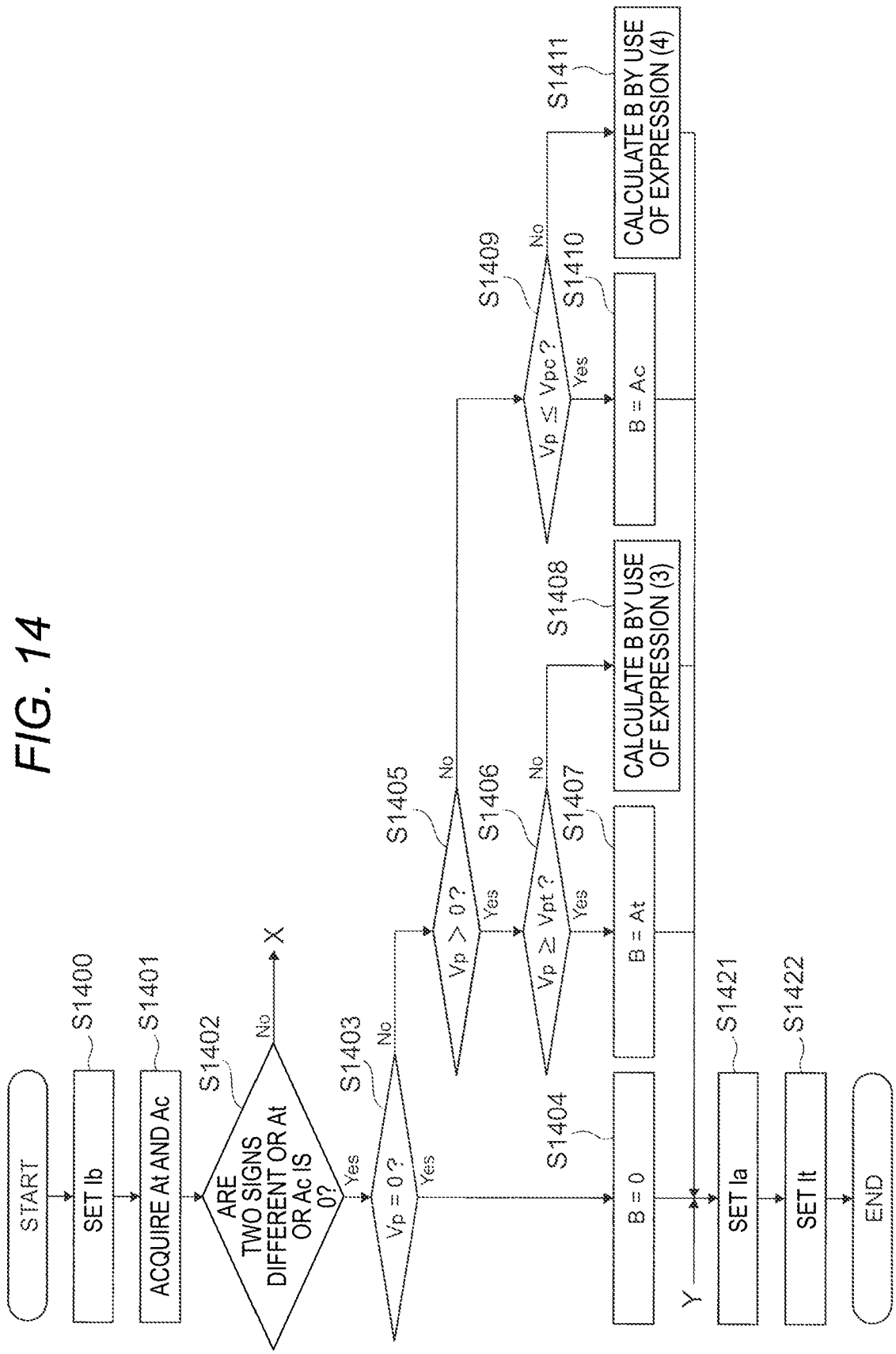
FIG. 14 is a flow chart showing a sequence of a target current setting process performed by a setting section according to the second configuration example.
Figure 15:
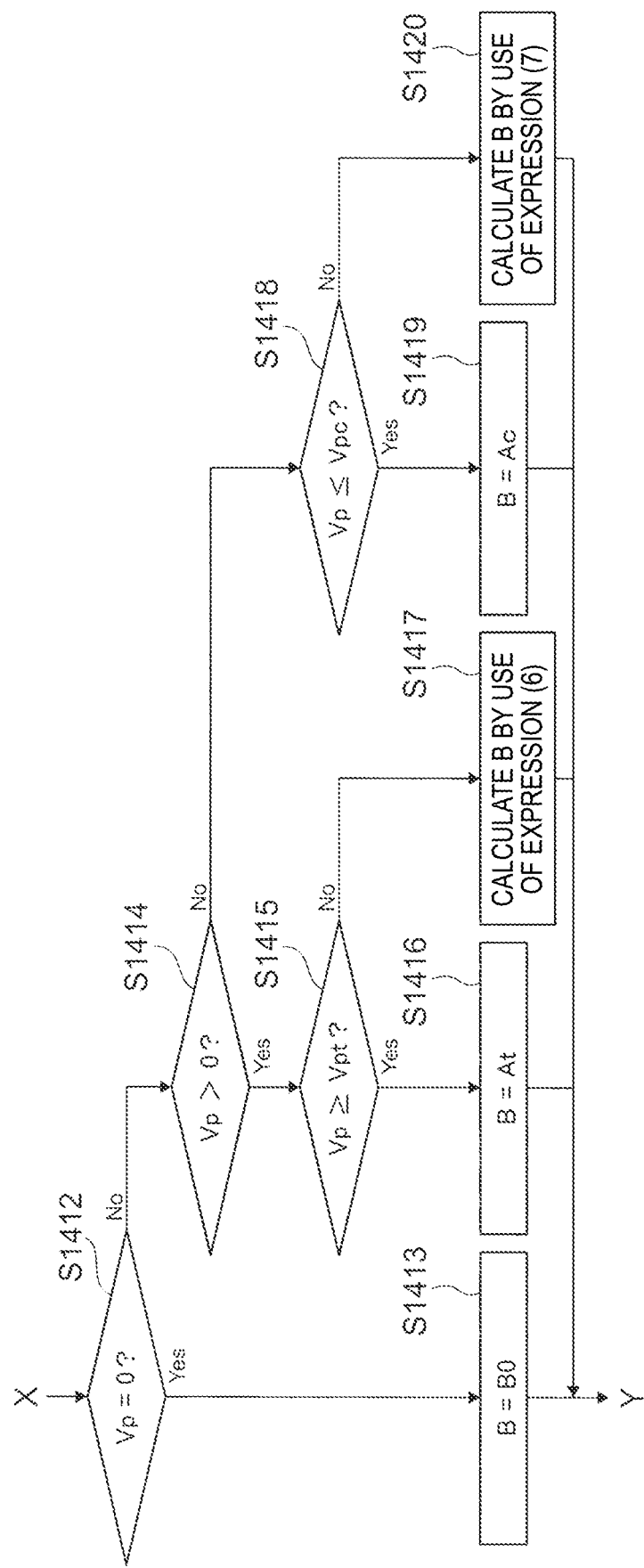
FIG. 15 is a flow chart showing the sequence of the target current setting process performed by the setting section according to the second configuration example.

FIG. 14 and FIG. 15 are flow charts showing the sequence of the target current setting process performed by the setting section 520 according to the second configuration example.

The setting section 520 sets a reference current Ib (S1400). This is a process in which the reference setting section 121 acquires a stroke velocity Vp calculated by the calculation section 110 and calculates the reference current Ib based on the acquired stroke velocity Vp and, for example, the control map shown in FIG. 4.

The setting section 520 acquires At and Ac (S1401). This is a process in which the adjustment amount determining section 541 acquires At and Ac set by the user through the UI 470.

The setting section 520 determines whether the sign of At and the sign of Ac are different or At or Ac is 0 or not (S1402). This is a process in which the adjustment amount determining section 541 of the adjustment section 522 makes the determination based on the signs of the acquired At and Ac.

When the signs of At and Ac are different or At or Ac is 0 (Yes in S1402), the adjustment amount determining section 541 determines whether the stroke velocity Vp is 0 or not (S1403). This is the same as the process of the aforementioned S702. When the stroke velocity Vp is 0 (Yes in S1403), the adjustment amount determining section 541 determines an adjustment amount B as 0 (S1404).

On the other hand, when the stroke velocity Vp is not 0 (No in S1403), the adjustment amount determining section 541 determines whether the stroke velocity Vp is positive or not (S1405). When the stroke velocity Vp is positive (Yes in S1405), the adjustment amount determining section 541 determines whether the stroke velocity Vp is equal to or higher than an extension occasion predetermined velocity Vpt or not (S1406). When the stroke velocity Vp is equal to or higher than the extension occasion predetermined velocity Vpt (Yes in S1406), the adjustment amount determining section 541 determines At as the adjustment amount B (S1407). On the other hand, when the stroke velocity Vp is not equal to or higher than the extension occasion predetermined velocity Vpt (No in S1406), the stroke velocity Vp is higher than 0 but lower than the extension occasion predetermined velocity Vpt so that the adjustment amount determining section 541 determines a value obtained by substituting the stroke velocity Vp into the aforementioned expression (3) as the adjustment amount B (S1408).

When the stroke velocity Vp is not positive (No in S1405), the adjustment amount determining section 541 determines whether the stroke velocity Vp is equal to or lower than a compression occasion predetermined velocity Vpc or not (S1409). When the stroke velocity Vp is equal to or lower than the compression occasion predetermined velocity Vpc (Yes in S1409), the adjustment amount determining section 541 determines Ac as the adjustment amount B (S1410). When the stroke velocity Vp is not equal to or lower than the compression occasion predetermined velocity Vpc (No in S1409), the stroke velocity Vp is higher than the compression occasion predetermined velocity Vpc but lower than 0 so that the adjustment amount determining section 541 determines a value obtained by substituting the stroke velocity Vp into the aforementioned expression (4), as the adjustment amount B (S1411).

On the other hand, when the sign of At and the sign of Ac are the same, and both At and Ac are not 0 (No in S1402), the adjustment amount determining section 541 determines whether the stroke velocity Vp is 0 or not (S1412). When the stroke velocity Vp is 0 (Yes in S1412), the adjustment amount determining section 541 determines the adjustment amount B, as B0 calculated by use of the aforementioned expression (5) (S1413).

When the stroke velocity Vp is not 0 (No in S1412), the adjustment amount determining section 541 determines whether the stroke velocity Vp is positive or not (S1414). When the stroke velocity Vp is positive (Yes in S1414), the adjustment amount determining section 541 determines whether the stroke velocity Vp is equal to or higher than the extension occasion predetermined velocity Vpt or not (S1415). When the stroke velocity Vp is equal to or higher than the extension occasion predetermined velocity Vpt (Yes in S1415), the adjustment amount determining section 541 determines At as the adjustment amount B (S1416). On the other hand, when the stroke velocity Vp is not equal to or higher than the extension occasion predetermined velocity Vpt (No in S1415), the stroke velocity Vp is higher than 0 but lower than the extension occasion predetermined velocity Vpt so that the adjustment amount determining section 541 determines a value obtained by substituting the stroke velocity Vp into the aforementioned expression (6), as the adjustment amount B (S1417).

When the stroke velocity Vp is not positive (No in S1414), the adjustment amount determining section 541 determines whether the stroke velocity Vp is equal to or lower than the compression occasion predetermined velocity Vpc or not (S1418). When the stroke velocity Vp is equal to or lower than the compression occasion predetermined velocity Vpc (Yes in S1418), the adjustment amount determining section 541 determines Ac as the adjustment amount B (S1419). When the stroke velocity Vp is not equal to or lower than the compression occasion predetermined velocity Vpc (No in S1418), the stroke velocity Vp is higher than the compression occasion predetermined velocity Vpc but lower than 0 so that the adjustment amount determining section 541 determines a value obtained by substituting the stroke velocity Vp into the aforementioned expression (7), as the adjustment amount B (S1420).

After determining the adjustment amount B in S1404, S1407, S1408, S1410, S1411, S1413, S1416, S1417, S1419 or S1420, the setting section 520 sets an adjustment current Ia (S1421). This is a process in which the calculation section 542 sets a value obtained by multiplying the adjustment amount B determined in S1404, S1407, S1408, S1410, S1411, S1413, S1416, S1417, S1419 or S1420 by a current amount Ip which is set in advance, as the adjustment current Ia (=B×Ip).

Then, the setting section 520 sets a target current It (S1422). This is a process in which the target setting section 123 sets a value obtained by adding the reference current Ib set in S1400 and the adjustment current Ia set in S1421, as the target current It (It=Ib+Ia).

When the setting section 520 performs the target current setting process to set the target current It as described above, the control device 500 controls the damping force of the damping device 200 by the following method (a control method according to the second configuration example).

That is, provided is the method for controlling the damping force of the damping device 200 which damps an extension-direction force increasing a relative displacement between the vehicle body 10 and the wheel and which damps a compression-direction force decreasing the relative displacement, the method being characterized in that:

an extension occasion adjustment value for adjusting an extension occasion damping force when a change velocity of the relative displacement is positive, and a compression occasion adjustment value for adjusting a compression occasion damping force when the change velocity is negative are acquired from an operating section which is operated in order to set the extension occasion adjustment value and the compression occasion adjustment value;

a target value of the extension occasion damping force and a target value of the compression occasion damping force are determined based on a base damping force determined based on the change velocity and the extension occasion adjustment value or the compression occasion adjustment value in a case where the change velocity is not zero; and the base damping force is determined as a target value of a zero occasion damping force when the change velocity is zero, in a case where the change velocity is zero.

That is, the control device 500 acquires At and Ac set by the user through the UI 470 in the step 1401 shown in FIG. 14.

The control device 500 calculates the reference current Ib which is the base of the base damping force in the step 1400 shown in FIG. 14. In addition, the control device 500 determines the adjustment amount B when the stroke velocity Vp is higher than 0 in the step 1407 or the step 1408 shown in FIG. 14 or in the step 1416 or the step 1417 shown in FIG. 15, and sets the adjustment current Ia when the stroke velocity Vp is higher than 0 in the step 1421. In addition, the control device 500 determines the adjustment amount B when the stroke velocity Vp is lower than 0 in the step 1410 or the step 1411 shown in FIG. 14 or in the step 1419 or the step 1420 shown in FIG. 15, and sets the adjustment current Ia when the stroke velocity Vp is lower than 0 in the step S1421. In this manner, the control device 500 determines the target value of the extension occasion damping force and the target value of the compression occasion damping force based on the base damping force and At or Ac. In addition, the control device 500 determines the adjustment amount B when the stroke velocity Vp is 0, as zero in the step S1404 shown in FIG. 14, and sets the adjustment current Ia when the stroke velocity Vp is 0, as zero in the step 1421. The control device 500 sets the value obtained by adding the reference current Ib and the adjustment current Ia as the target current It, i.e. sets the reference value Ib as the target current It because the adjustment current Ia is zero. In this manner, the control device 500 determines the base damping force as the target value of the zero occasion damping force.

Here, in the case where the adjustment direction of the extension occasion adjustment value and the adjustment direction of the compression occasion adjustment value are different, the base damping force may be determined as the target value of the zero occasion damping force. In the case where the adjustment directions are the same, the target value of the zero occasion damping force may be determined based on the extension occasion adjustment value and the compression occasion adjustment value.

That is, in the case where it is determined that the sign of At and the sign of Ac are different in the step 1402 shown in FIG. 14, the control device 500 determines the adjustment amount B when the stroke velocity Vp is 0, as zero in the step 1404 shown in FIG. 14, and sets the adjustment current Ia as zero in the step 1421. The control device 500 sets the reference current Ib as the target current It in the step 1422. In this manner, the control device 500 determines the base damping force as the target value of the zero occasion damping force in the case where the sign of At and the sign of Ac are different. On the other hand, in the case where it is determined that the sign of At and the sign of Ac are the same in the step 1402 shown in FIG. 14, the control device 500 determines the adjustment amount B when the stroke velocity Vp is 0, as B0, i.e. as the value determined based on At and Ac, in the step S1413 shown in FIG. 15. The control device 500 sets the adjustment current Ia when the stroke velocity Vp is 0, by use of the adjustment amount B in the step 1421, and sets the value obtained by adding the reference current Ib and the adjustment current Ia, as the target current It in the step 1422. In this manner, the control device 500 determines the target value of the zero occasion damping force based on At and Ac in the case where the sign of At and the sign of Ac are the same.

In addition, when one of the extension occasion adjustment value and the compression occasion adjustment value is zero, the base damping force may be determined as the target value of the zero occasion damping force.

That is, in the case where it is determined that At or Ac is 0 in the step 1402 shown in FIG. 14, the control device 500 determines the adjustment amount B when the stroke velocity Vp is 0, as zero in the step 1404 shown in FIG. 14, and sets the adjustment current Ia as zero in the step 1421. The control device 500 sets the reference current Ib as the target current It in the step 1422. In this manner, the control device 500 determines the base damping force as the target value of the zero occasion damping force when At or Ac is 0.

As described above, the setting section 520 of the control device 500 according to the second configuration example adds the reference current Ib set by the reference setting section 121 based on the stroke velocity Vp and the adjustment current Ia set by the adjustment section 522, to thereby set the target current It. In the aforementioned manner, each damping force control valve 240 controls pressure of working oil passing through the valve in accordance with an amount of a current fed to a corresponding solenoid. The control device 500 controls an amount of a current fed to the solenoid of the damping force control valve 240, to thereby control the damping force of the damping device 200. In other words, the control device 500 controls the amount of the current fed to the solenoid of the damping force control valve 240 so that the damping force of the damping device 200 can be a desired damping force. Accordingly, the control device 500 is an example of a first determination section which determines the target value of the extension occasion damping force or the target value of the compression occasion damping force based on the base damping force generated due to the reference current Ib set based on the stroke velocity Vp, and At or Ac, in the case where the stroke velocity Vp is not 0. In addition, the control device 500 is an example of a second determination section which determines the base damping force generated due to the reference current Ib set based on the stroke velocity Vp, as the target value of the zero occasion damping force, in the in the case where the stroke velocity Vp is not 0 case where the stroke velocity Vp is 0.

As described above, the suspension apparatus 420 according to the second configuration example is provided with the damping device 200 which damps an extension-direction force increasing a relative displacement between a vehicle body 10 and a wheel and which damps a compression-direction force decreasing the relative displacement. In addition, the suspension apparatus 420 according to the second configuration example is provided with the UI 470 as the example of the operating section which is operated in order to set an extension occasion damping adjustment value for adjusting an extension occasion damping force when a stroke velocity Vp as a change velocity of the relative displacement is positive, and a compression occasion adjustment value for adjusting a compression occasion damping force when the stroke velocity Vp is negative. In addition, the suspension apparatus 420 according to the second configuration example is provided with the control device 500 as an example of a first determination section. In the case where the stroke velocity Vp is not zero, the control device 500 as the example of the first determination section determines a target value of the extension occasion damping force (extension occasion target current It) and a target value of the compression occasion damping force (compression occasion target current It) based on a base damping force determined based on the stroke velocity Vp and the extension occasion adjustment value or the compression occasion adjustment value set through the UI 470. In addition, the suspension apparatus 420 according to the second configuration example is provided with the control device 500 as an example of a second determination section. In the case where the stroke velocity Vp is zero, the control device 500 as the example of the second determination section determines the base damping force determined based on the stroke velocity Vp as a target value of a zero occasion damping force (zero occasion target current It) when the stroke velocity Vp is zero.

In either the case where the sign of At and the sign of Ac are different or the case where the sign of At and the sign of Ac are the same, the control device 500 adds a value obtained by multiplying a current amount Ip which is set in advance by At, to a reference current Ib, and sets a resulting value obtained by the addition as the target current It (It=Ib+Ip×At) when the stroke velocity Vp is positive and equal to or higher than an extension occasion predetermined velocity Vpt (0<Vpt≤Vp). In this manner, the control device 500 sets the target current It by use of the reference current Ib which is the base of the base damping force and At, to thereby determine the target value of the extension occasion damping force.

In addition, in either the case where the sign of At and the sign of Ac are different or the case where the sign of At and the sign of Ac are the same, the control device 500 adds a value obtained by multiplying the current amount Ip which is set in advance by Ac to the reference value Ib, and sets a resulting value obtained by the addition as the target current It (It=Ib+Ip×Ac) when the stroke velocity Vp is negative and equal to or lower than a compression occasion predetermined velocity Vpc (Vp≤Vpc<0). In this manner, the control device 500 sets the target current It by use of the reference current Ib which is the base of the base damping force and Ac, to thereby determine the target value of the compression occasion damping force.

In addition, in the case where the sign of At and the sign of Ac are different and when the stroke velocity Vp is zero, the control device 500 sets the reference current Ib as the target current It (It=Ib), to thereby determine the target value of the zero occasion damping force. In this manner, the control device 500 sets the target current It by use of the reference current Ib which is the base of the base damping force, to thereby determine the target value of the zero occasion damping force.

In addition, in the case where the sign of At and the sign of Ac are different and when the stroke velocity Vp is positive and lower than the extension occasion predetermined velocity Vpt (0<Vp<Vpt), the control device 500 determines the adjustment amount B by use of At and the expression (3), adds a value obtained by multiplying the current amount Ip which is set in advance by the adjustment amount B to the reference current Ib, and sets a resulting value obtained by the addition as the target current It (It=Ib+Ip×B). In this manner, the control device 500 sets the target current It by use of the reference current Ib which is the base of the base damping force and At, to thereby determine the target value of the extension occasion damping force.

In addition, in the case where the sign of At and the sign of Ac are different and when the stroke velocity Vp is negative and higher than the compression occasion predetermined velocity Vpc (Vpc<Vp<0), the control device 500 determines the adjustment amount B by use of Ac and the expression (4), adds a value obtained by multiplying the current amount Ip which is set in advance by the adjustment amount B to the reference current Ib, and sets a resulting value obtained by the addition as the target current It (It=Ib+Ip×B). In this manner, the control device 500 sets the target current It by use of the reference current Ib which is the base of the base damping force and Ac, to thereby determine the target value of the compression occasion damping force.

In addition, in the case where the sign of At and the sign of Ac are the same and when the stroke velocity Vp is zero, the control device 500 determines the adjustment amount B by use of At, Ac and the expression (5), adds a value obtained by multiplying the current amount Ip which is set in advance by the adjustment amount B to the reference current Ib, and sets a resulting value obtained by the addition as the target current It (It=Ib+Ip×B). In this manner, the control device 500 sets the target current It by use of the reference current Ib which is the base of the base damping force, At and Ac, to thereby determine the target value of the zero occasion damping force.

In addition, in the case where the sign of At and the sign of Ac are the same and when the stroke velocity Vp is positive and lower than the extension occasion predetermined velocity Vpt (0<Vp<Vpt), the control device 500 determines the adjustment amount B by use of At, Ac, the expression (5) and the expression (6), adds a value obtained by multiplying the current amount Ip which is set in advance by the adjustment amount B to the reference current Ib, and sets a resulting value obtained by the addition as the target current It (It=Ib+Ip×B). In this manner, the control device 500 sets the target current It by use of the reference current Ib which is the base of the base damping force, At and Ac, to thereby determine the target value of the extension occasion damping force.

In addition, in the case where the sign of At and the sign of Ac are the same and when the stroke velocity Vp is negative and higher than the compression occasion predetermined velocity Vpc (Vpc<Vp<0), the control device 500 determines the adjustment amount B by use of At, Ac, the expression (5) and the expression (7), adds a value obtained by multiplying the current amount Ip which is set in advance by the adjustment amount B to the reference current Ib, and sets a resulting value obtained by the addition as the target current It (It=Ib+Ip×B). In this manner, the control device 500 sets the target current It by use of the reference current Ib which is the base of the base damping force, At and Ac, to thereby determine the target value of the compression occasion damping force.

In addition, in the case where At and Ac are 0, the control device 500 sets the reference current Ib as the target current It (It=Ib) regardless of the stroke velocity Vp. In this manner, the control device 500 sets the target current It by use of the reference current Ib which is the base of the base damping force, to thereby determine the target value of the extension occasion damping force, the target value of the compression occasion damping force and the target value of the zero occasion damping force.

In addition, in the case where At or Ac is 0 but At and Ac are not the same in value, and when the stroke velocity Vp is zero, the control device 500 sets the reference current Ib as the target current It (It=Ib), to thereby determine the target value of the zero occasion damping force. In this manner, the control device 500 sets the target current It by use of the reference current Ib which is the base of the base damping force, to thereby determine the target value of the zero occasion damping force.

According to the suspension apparatus 420 having the aforementioned configuration according to the second configuration example, in the case where the sign of At and the sign of Ac set through the UI 470 are different or At or Ac is 0, and when the stroke velocity Vp is 0, the adjustment amount B is 0 (S1404). Therefore, in such a case, the adjustment current Ia is zero (0). Accordingly, the target current It is equivalent to the reference current Ib. That is, when the stroke velocity Vp is zero, the base damping force generated due to the reference current Ib determined based on the stroke velocity Vp is the target value of the zero occasion damping force. In other words, the zero occasion damping force is the base damping force generated due to the reference current Ib, and any damping force based on At or Ac set through the UI 470 is not taken into consideration. Therefore, according to the suspension apparatus 420 according to the second configuration example, for example, the damping force can be suppressed from being adjusted to increase while a value to reduce the damping force is set as At or Ac through UI 470. For example, the damping force is suppressed from being adjusted in a direction of making the damping force larger than the base damping force in a region where the stroke velocity Vp is equal to or higher than zero but lower than the extension occasion predetermined velocity Vpt while a negative value (the value to reduce the damping force) is set as At, as shown in FIG. 12. Thus, according to the suspension apparatus 420 according to the second configuration example, the damping force can be accurately adjusted to a damping force desired by the user, in comparison with the background-art configuration in which only the extension occasion damping force and the compression occasion damping force can be simply adjusted.

In addition, according to the suspension apparatus 420 according to the second configuration example, the user can adjust the damping force through the UI 470 disposed adjacently to the handle 12. Therefore, the user who has straddled to sit on the seat of the motorcycle 400 can adjust the damping force. In addition, the user can adjust the damping force, for example, without using any tool.

The aforementioned processes performed by the control device 500 can be carried out by software and hardware resources cooperating with each other. In this case, a CPU inside a control computer provided in the control device 500 executes a program for implementing the respective functions of the control device 100 to thereby implement the respective functions. For example, a recording medium having the program recorded therein is provided to the control device 500, and the CPU of the control device 500 reads the program stored in the recording medium. In this case, the program per se read from the recording medium implements the function of the aforementioned configuration example. Accordingly, the program per se and the recording medium having the program recorded therein constitute the present invention. For example, a flexible disk, a CD-ROM, a DVD-ROM, a hard disk, an optical disk, a magnetooptical disk, a CD-R, a magnetic tape, a non-volatile memory card or an ROM can be exemplified as the recording medium for supplying such a program.

Figure 16:
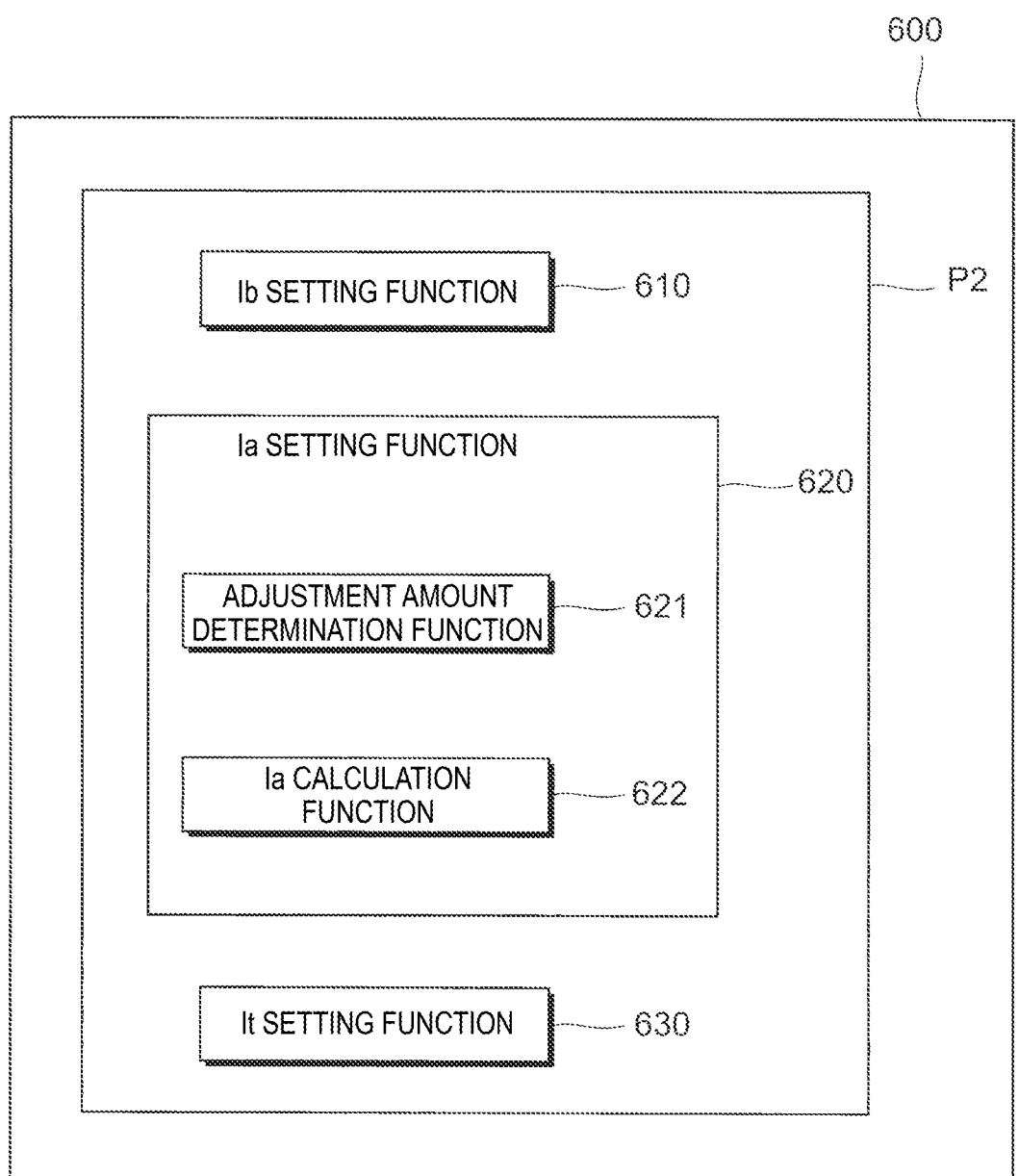
FIG. 16 is a diagram showing a schematic configuration of a recording medium according to the second configuration example.

FIG. 16 is a diagram showing a schematic configuration of a recording medium 600 according to the second configuration example.

As shown in FIG. 16, the recording medium 600 according to the second configuration example stores a program P2. The program P2 includes an Ib setting function 610 of setting a reference current Ib, an Ia setting function 620 of setting an adjustment current Ia for adjusting a damping force based on an adjustment value A, and an It setting function 630 of setting a target current It.

The Ia setting function 620 has an adjustment amount determination function 621 of determining an adjustment amount B, and an Ia calculation function 622 of calculating the adjustment current Ia based on the adjustment amount B.

The Ib setting function 610 is a module implementing the function of the reference setting section 121 shown in FIG. 10.

The Ia setting function 620 is a module implementing the function of the adjustment section 522 shown in FIG. 10.

The It setting function 630 is a module implementing the function of the target setting section 123 shown in FIG. 10.

The adjustment amount determination function 621 is a module implementing the function of the adjustment amount determining section 541 shown in FIG. 10.

The Ia calculation function 622 is a module implementing the function of the calculation section 542 shown in FIG. 10.

As described above, the recording medium 600 according to the second configuration example is a non-transitory computer-readable recording medium having a program recorded therein, the program making a computer implement: a function of acquiring an extension occasion adjustment value and a compression occasion adjustment value in a damping device 200 which damps an extension-direction force increasing a relative displacement between a vehicle body 10 and a wheel and which damps a compression-direction force decreasing the relative displacement, the extension occasion adjustment value serving for adjusting an extension occasion damping force when a change velocity of the relative displacement is positive, the compression occasion adjustment value serving for adjusting a compression occasion damping force when the change velocity is negative; a function of determining a target value of the extension occasion damping force and a target value of the compression occasion damping force based on a base damping force determined based on the change velocity and the extension occasion adjustment value or the compression occasion adjustment value when the change velocity is not zero; and a function of determining the base damping force as a target value of a zero occasion damping force when the change velocity is zero, in the case where the change velocity is zero.

Incidentally, after the program read from the recording medium 600 is written into an internal memory of the control computer provided in the control device 500, the CPU etc. may perform a portion or the whole of an actual process based on an instruction of the program so that the aforementioned function of the second configuration example can be realized by the process.

In addition, the program of the software implementing the function of the second configuration example may be distributed through a network to be stored in a recording means such as a hard disk or an ROM of the control device 500 or a recording medium such as a CD-RW or a CD-R. In use, the CPU of the control device 500 may read and execute the program stored in the recording means or the recording medium.

Third Configuration Example

Figure 17:
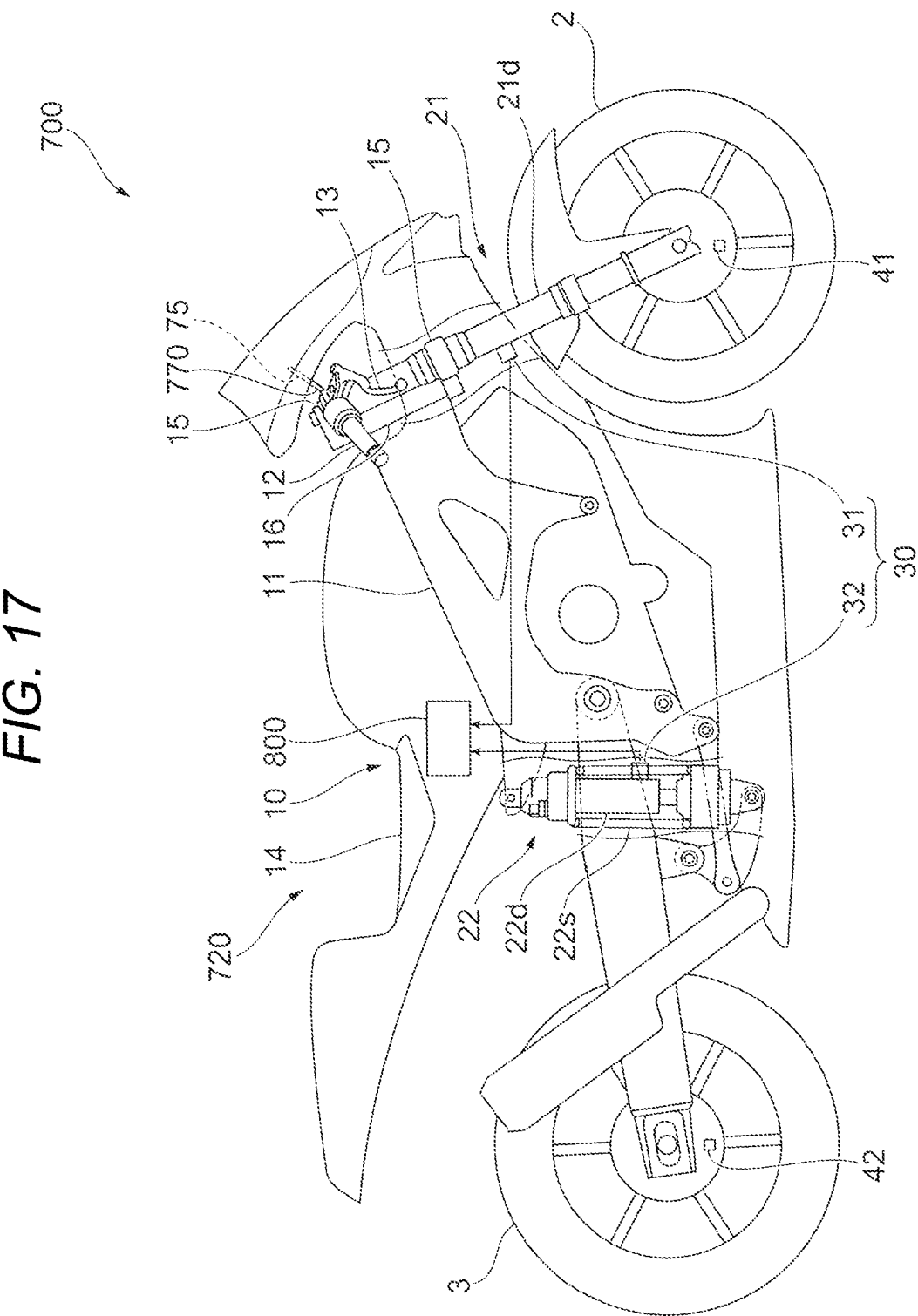
FIG. 17 is a view showing a schematic configuration of a motorcycle according to a third configuration example.

FIG. 17 is a view showing a schematic configuration of a motorcycle 700 according to a third configuration example.

Figure 18:
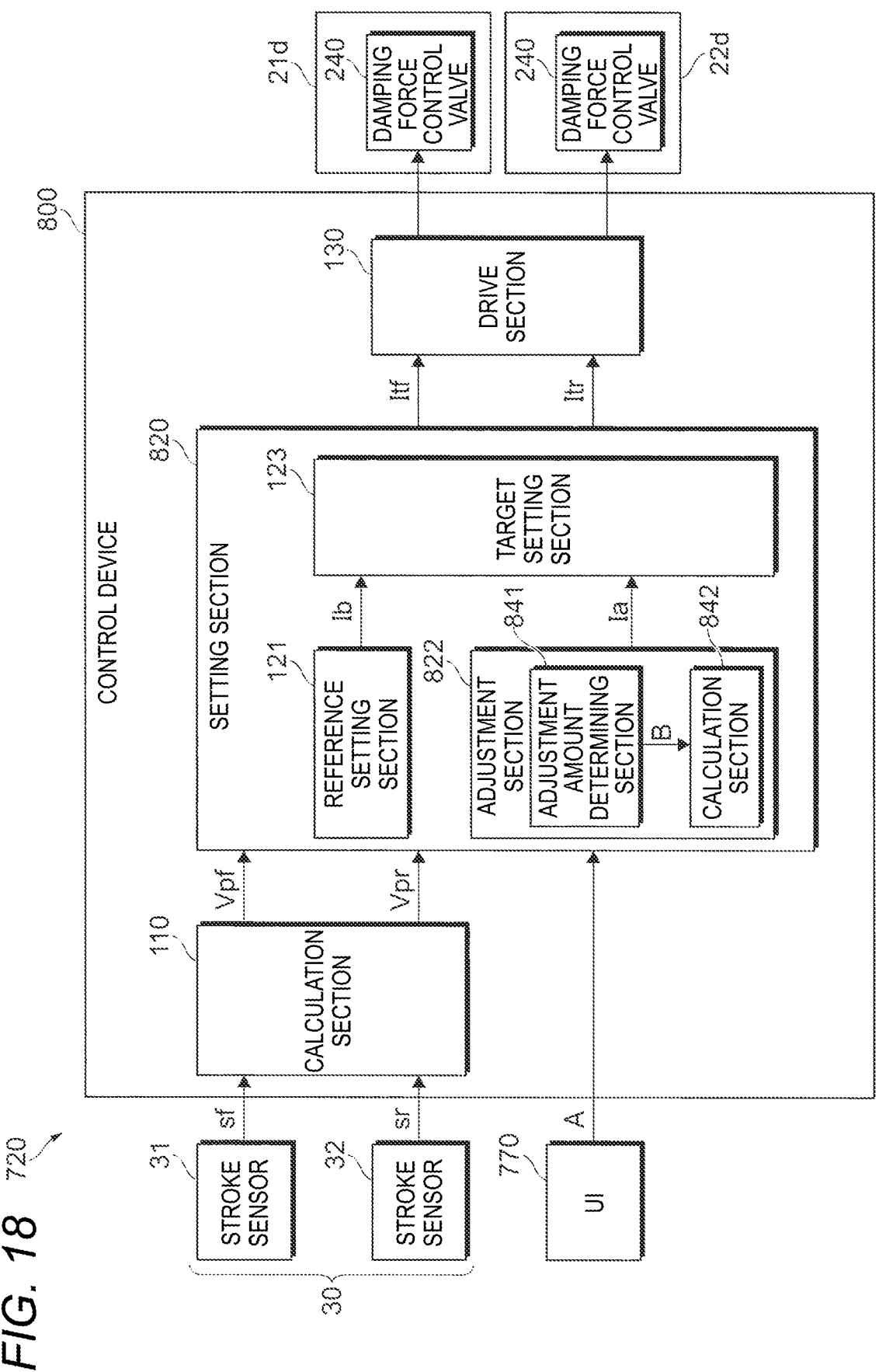
FIG. 18 is a diagram of a schematic configuration of a control device according to the third configuration example.

FIG. 18 is a diagram showing a schematic configuration of a control device 800 according to the third configuration example.

In the motorcycle 700 according to the third configuration example, a constituent corresponding to the UI 70 or the UI 470 and a constituent corresponding to the adjustment section 122 of the control device 100 or the adjustment section 522 of the control device 500 are different from those in the motorcycle 1 according to the first configuration example and the motorcycle 400 according to the second configuration example. The different points from the motorcycle 1 according to the first configuration example and the motorcycle 400 according to the second configuration example will be described below. Of the motorcycle 700 according to the third configuration example, constituents having the same shapes and functions as those of the motorcycle 1 according to the first configuration example and the motorcycle 400 according to the second configuration example will be referred to by the same signs correspondingly and respectively, and detailed description thereof will be omitted.

As shown in FIG. 17, the motorcycle 700 according to the third configuration example is provided with a control device 800 which controls damping forces of a damping device 21d and a damping device 22d, and a UI 770 which can be operated by a user. A suspension apparatus 720 according to the third configuration example is an apparatus having a suspension (a suspension 21 and a suspension 22), a stroke sensor 30, the UI 770, and the control device 800.

As shown in FIG. 18, the control device 800 according to the third configuration example is provided with a calculation section 110, a setting section 820, and a drive section 130.

The setting section 820 has a reference setting section 121, an adjustment section 822, and a target setting section 123. The reference setting section 121 sets a reference current Ib as a reference in setting a target current It. The adjustment section 822 sets an adjustment current Ia for adjusting a damping force based on an adjustment value A. The target setting section 123 adds the reference current Ib and the adjustment current Ia to thereby finally set the target current It.

As shown in FIG. 18, the adjustment section 822 has an adjustment amount determining section 841 and a calculation section 842. The adjustment amount determining section 841 determines an adjustment amount B based on the adjustment value A set by a user through the UI 770. The calculation section 842 calculates the adjustment current Ia based on the adjustment amount B determined by the adjustment amount determining section 841.

The UI 770 includes a function provided by the UI 70 according to the first configuration example, which can set three adjustment values A, and a function provided by the UI 470 according to the second configuration example, which can set two adjustment values A. In addition, the UI 770 according to the third configuration example has a function of performing changeover between the function which can set the three adjustment values A and the function which can set the two adjustment values A, by setting of the user.

Incidentally, the function of performing changeover between the function which can set the three adjustment values A and the function which can set the two adjustment values A, by the setting of the user, may be implemented not by a display section of the UI 770 (operating section) but by a changeover switch (not shown). For example, a rocker switch changed over by pressing one end portion and the other end portion can be used as the changeover switch. Specifically, a switch etc. in which the three adjustment values A can be set through the display section when the one end portion is pressed and the two adjustment values A can be set through the display section when the other end portion is pressed can be exemplified. For example, the changeover switch can be illustrated to be disposed adjacently to the UI 770 (operating section).

When the function which can set the three adjustment values A is selected, the adjustment amount determining section 844 according to the third configuration example determines the adjustment amount B by a technique similar to or the same as the adjustment amount determining section 141 according to the first configuration example. On the other hand, when the function which can set the two adjustment values A is set, the adjustment amount determining section 841 according to the third configuration example determines the adjustment amount B by a technique similar to or the same as the adjustment amount determining section 541 according to the second configuration example.

Thus, according to the suspension apparatus 720 according to the third configuration example, the user can be prompted to select one from an effect of the suspension apparatus 20 according to the first configuration example and an effect of the suspension apparatus 420 according to the second configuration example. Thus, when the function which can set the three adjustment values A is selected, it is possible to improve the degree of freedom for setting of the suspension 21 and the suspension 22. Accordingly, it is possible to finely adjust the damping force to one suiting the user's needs, in comparison with the configuration in which only the extension occasion damping force and the compression occasion damping force can be adjusted. In addition, when the function which can set the two adjustment values A is selected, it is possible to accurately adjust the damping force to one desired by the user in comparison with the background-art configuration in which only the extension occasion damping force and the compression occasion damping force can be simply adjusted.

REFERENCE SIGNS LIST 1, 400, 700 . . . motorcycle, 2 . . . front wheel, 3 . . . rear wheel, 21 . . . suspension, 22 . . . suspension, 70, 470, 770 . . . UI (operating section), 100 . . . control device (determination section), 110 . . . calculation section, 120, 520, 820 . . . setting section, 122, 522, 822 . . . adjustment section, 130 . . . drive section, 200 . . . damping device, 240 . . . damping force control valve, 500 . . . control device (first determination section, second determination section), 800 . . . control device

The invention claimed is:

1. A suspension apparatus comprising:
a damping device which damps a force in an extension-direction where a relative displacement between a vehicle body and a wheel increases, and damps a force in a compression-direction where the relative displacement decreases;
an operating section which is operated in order to set an extension adjustment value for adjusting an extension damping force when a change velocity of the relative displacement is positive, a compression adjustment value for adjusting a compression damping force when the change velocity is negative, and a zero adjustment value for adjusting a zero damping force when the change velocity is zero; and
a determination section which determines a target value of the extension damping force, a target value of the compression damping force and a target value of the zero damping force; wherein:
the determination section:
determines the target value of the extension damping force by using; (i) a base damping force and the extension adjustment value, or (ii) the base damping force, the extension adjustment value and the zero adjustment value, said base damping force being determined based on the change velocity,
determines the target value of the compression damping force by using; (i) the base damping force, the compression adjustment value and the zero adjustment value, or (ii) the base damping force and the compression adjustment value, and
determines the target value of the zero damping force by using the base damping force and the zero adjustment value to determine the target value of the zero damping force.

2. The suspension apparatus according to claim 1, wherein:
to determining the target value of the extension damping force, the determination section uses the base damping force and the extension adjustment value when the change velocity is equal to or higher than an extension predetermined velocity which is set in advance, and uses the base damping force, the extension adjustment value and the zero adjustment value when the change velocity is lower than the extension predetermined velocity.

3. The suspension apparatus according to claim 2, wherein:
to determine the target value of the compression damping force, the determination section uses the base damping force and the compression adjustment value when the change velocity is equal to or lower than a compression predetermined velocity which is set in advance, and uses the base damping force, the compression adjustment value and the zero adjustment value when the change velocity is higher than the compression predetermined speed.

4. The suspension apparatus according to claim 1, wherein:
to determine the target value of the compression damping force, the determination section uses the base damping force and the compression adjustment value when the change velocity is equal to or lower than a compression predetermined velocity which is set in advance, and uses the base damping force, the compression adjustment value and the zero adjustment value when the change velocity is higher than the compression predetermined speed.

5. A suspension apparatus comprising:
a damping device which damps a force in an extension-direction where a relative displacement between a vehicle body and a wheel increases, and damps a force in a compression-direction where the relative displacement decreases;
an operating section which is operated in order to set an extension adjustment value for adjusting an extension damping force when a change velocity of the relative displacement is positive, and a compression adjustment value for adjusting a compression damping force when the change velocity is negative;
a first determination section which determines a target value of the extension damping force and a target value of the compression damping force; and
a second determination section which determines a target value of a zero damping force when the change velocity is zero; wherein:
in a case where an adjustment direction of the extension adjustment value and an adjustment direction of the compression adjustment value are the same, the first determination section:
determines the target value of the extension damping force by use of a base damping force and the extension adjustment value when the change velocity is equal to or higher than an extension predetermined velocity which is set in advance, said base damping force being determined based on the change velocity, and determines the target value of the extension damping force by use of the base damping force, the extension adjustment value and the compression adjustment value when the change velocity is lower than the extension predetermined velocity, and
determines the target value of the compression damping force by use of the base damping force and the compression adjustment value when the change velocity is equal to or lower than a compression predetermined velocity which is set in advance, and determines the target value of the compression damping force by use of the base damping force, the extension adjustment value and the compression adjustment value when the change velocity is higher than the compression predetermined velocity; and
the second determination section uses the base damping force, the extension adjustment value and the compression occasion adjustment value to determine the target value of the zero damping force.

6. The suspension apparatus according to claim 5, wherein:
the second determination section determines the target value of the zero damping force by use of the base damping force, the extension adjustment value and the compression adjustment value in the case where the adjustment direction of the extension adjustment value and the adjustment direction of the compression adjustment value are the same.

* * * * *